United States Patent
Khashab et al.

(10) Patent No.: US 10,807,048 B2
(45) Date of Patent: Oct. 20, 2020

(54) COMPOSITIONS OF GRAPHENE MATERIALS WITH METAL NANOSTRUCTURES AND MICROSTRUCTURES AND METHODS OF MAKING AND USING INCLUDING PRESSURE SENSORS

(71) Applicant: KING ABDULLAH UNIVERSITY OF SCIENCE AND TECHNOLOGY, Thuwal (SA)

(72) Inventors: Niveen M. Khashab, Thuwal (SA); Ye Chen, Thuwal (SA); Jing Tao, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 263 days.

(21) Appl. No.: 15/739,091

(22) PCT Filed: Jul. 14, 2016

(86) PCT No.: PCT/IB2016/001174
§ 371 (c)(1),
(2) Date: Dec. 21, 2017

(87) PCT Pub. No.: WO2017/013497
PCT Pub. Date: Jan. 26, 2017

(65) Prior Publication Data
US 2018/0207590 A1 Jul. 26, 2018

Related U.S. Application Data

(60) Provisional application No. 62/194,097, filed on Jul. 17, 2015.

(51) Int. Cl.
*B01D 69/14* (2006.01)
*B01D 71/02* (2006.01)
(Continued)

(52) U.S. Cl.
CPC ......... *B01D 69/148* (2013.01); *B01D 69/141* (2013.01); *B01D 71/021* (2013.01);
(Continued)

(58) Field of Classification Search
CPC .. B01D 69/148; B01D 69/141; B01D 71/021; B01D 71/022; C01B 32/194; B82Y 30/00; B82Y 40/00
See application file for complete search history.

(56) References Cited

U.S. PATENT DOCUMENTS 8,993,113 B2   3/2015  Pauzauskie et al.
9,045,346 B2   6/2015  Nesper et al.
(Continued)

OTHER PUBLICATIONS

Gao, et al., One-pot synthyesis of stabilizer-free Ag-Graphene Nanocomposite and its potential application on degredation of RhB, 2013 Proceedings of the 13th IEEE International Conference on Nanotechnology (IEEE-NANO 2012), IEEE pp. 274-279 (Aug. 5, 2013) (Year: 2013).*
(Continued)

*Primary Examiner* — Daniel C. McCracken
(74) *Attorney, Agent, or Firm* — Patent Portfollio Builders PLLC

(57) ABSTRACT

Composition comprising at least one graphene material and at least one metal. The metal can be in the form of nanoparticles as well as microflakes, including single crystal microflakes. The metal can be intercalated in the graphene sheets. The composition has high conductivity and flexibility. The composition can be made by a one-pot synthesis in which a graphene material precursor is converted to the graphene material, and the metal precursor is converted to the metal. A reducing solvent or dispersant such as NMP can be used. Devices made from the composition include a pressure sensor which has high sensitivity. Two two-dimension materials can be combined to form a hybrid material.

19 Claims, 32 Drawing Sheets

(51) Int. Cl.
　　　C01B 32/194　(2017.01)
　　　B82Y 30/00　(2011.01)
　　　B82Y 40/00　(2011.01)
(52) U.S. Cl.
　　　CPC .......... B01D 71/022 (2013.01); C01B 32/194 (2017.08); B82Y 30/00 (2013.01); B82Y 40/00 (2013.01)

(56) References Cited

U.S. PATENT DOCUMENTS

| | | | |
|---|---|---|---|
| 9,053,868 B2 | 6/2015 | Hee et al. | |
| 9,057,639 B2 | 6/2015 | Robinson et al. | |
| 9,064,778 B2 | 6/2015 | Lim et al. | |
| 2014/0219906 A1 | 8/2014 | Kim et al. | |

OTHER PUBLICATIONS

Meschi, et al., Highly electrically conductive adhesives using silver nanoparticle (Ag NP)-decorated graphene: the effect of NPs sintering on the electrical conductivity improvement, J. Mater. Sci: Mater Electron 2015; 26: 590-600 (Year: 2015).*

Zhang, et al., One-pot green synthesis, characterizations, and biosensor application of self-assembled reduced graphene oxide-gold nanoparticle hybrid membranes, J. Mater. Chem. B. 2013; 1: 65825-6531 (Year: 2013).*

Li et al., "Direction-Specific Interactions Control Crystal Growth by Oriented Attachment", Science 2012, 336, 1014-1018.

Liang et al., "Silver Nanowire Percolation Network Soldered with Graphene Oxide at Room Temperature and Its Application for Fully Stretchable Polymer Light-Emitting Diodes", ACS Nano. 2014, 8, 1590-1600.

International Search Report and Written Opinion received in connection with International Application No. PCT/IB2016/001174; dated Nov. 7, 2017.

Ai et al., "A Novel Strategy for Making Soluble Reduced Graphene Oxide sheets Cheaply by Adopting an Endogenous Reducing Agent", J. Mater. Chem. 2011, 21, 3365-3370.

Balandin et al., "Superior Thermal Conductivity of Single-layer Graphene", Nano Lett. 2008, 8, 902-907.

Bolotin et al., "Ultrahigh Electron Mobility in Suspended Graphene", Solid State Commun. 2008, 146, 351-355.

Brus, "Size, Dimensionality, and Strong Electron Correlation in Nanoscience Accounts", Chem. Res. 2014, 47, 2951-2959.

Choong et al., "Highly stretchable resistive pressure sensors using a conductive elastomeric composite on a micropyramid array", Adv. Mater., 26, 21, 3451-3458, 2014.

Chun et al. "Highly conductive, printable and stretchable composite films of carbon nanotube and silver", Nat. Nanotech. 2010, 5, 853-857.

Cochrane et al., "A Flexible Strain Sensor Based on a Conductive Polymer Composite for in situ Measurement of Parachute Canopy Deformation", Sensors, 2010, 10, 8291-8303.

Dikin et al., "Preparation and Characterization of Graphene Oxide Paper", Nature 2007, 448, 457-460.

Dubin et al., "A One-Step, Solvothermal Reduction Method for Producing Reduced Graphene Oxide Dispersions in Organic Solvents", Acs Nano 2010, 4, 3845-3852.

Fan et al., "Transparent Triboelectric Nanogenerators and Self-Powered Pressure Sensors Based on Micropatterned Plastic Films", Nano Lett. 2012, 12, 3109-3114.

Fang et al., "Double-Interface Growth Mode of Fractal Silver Trees within Replacement Reaction", Appl. Phys. Lett. 2006, 89, 173104.

Fang et al., "Mesocrystals: Synthesis in Metals and Applications", Chem. Soc. Rev. 2011, 40, 5347-5360.

Fang et al., "Self-assembly mechanism of platelike silver mesocrystal", Appl. Phys. Lett. 2007, 91, 083108.

Fang et al., "Self-Assembly Ability of Building Units in Mesocrystal, Structural, and Morphological Transitions in Ag Nanostructures Growth", Crystl. Growth Des. 2008, 8, 3616-3622.

Fang et al., "Dendritic silver nanostructure growth and evolution in replacement reaction", Crystl. Growth Des. 2007, 7, 864-867.

Fu et al., "Excitation Profile of Surface-Enhanced Raman Scattering in Graphene-Metal Nanoparticle based Derivatives", Nanoscale 2010, 2, 1461-1466.

Gao et al., "One-pot synthesis of stabilizer-free Ag-Graphene Nanocomposite and its potential application on photodegradation of RhB", 2013, Proceedings of the 13th IEEE International Conference on Nanotechnology (IEEE-NANO 2013), IEEE, Aug. 5, 2013, pp. 274-279.

Ghosh et al., "Dimensional Crossover of Thermal Transport in Few-layer Graphene", Nat. Mater. 2010, 9, 555-558.

Gong et al., "A Wearable and Highly Sensitive Pressure Sensor with Ultrathin Gold Nanowires", Nat. Commun. 2014, 5, 3132.

Han et al., "Layer-by-Layer-Assembled Reduced Graphene Oxide/Gold Nanoparticle Hybrid Double-Floating-Gate Structure for Low-Voltage Flexible Flash Memory", Adv. Mater. 2013, 25, 872-877.

He et al., "Nitrogen-doped Reduced Graphene Oxide Supports for Noble Metal Catalysts with Greatly Enhanced Activity and Stability", Appl. Catal. B-environ 2013, 132, 379-388.

Hummers et al., "Preparation of Graphitic Oxide", J. Am. Chem. Soc. 1958, 80, 1339-1339.

Jeon et al., "Understanding and Controlled Growth of Silver Nanoparticles Using Oxidized N-Methyl-pyrrolidone as a Reducing Agent", J. Phys. Chem. C 2010, 114, 36-40.

Jeong et al., "Evidence of Graphitic AB Stacking Order of Graphite Oxides", J. Am. Chem. Soc. 2008, 130, 1362-1366 (Advanced online publication).

Kiraly et al., "Solid-source growth and atomic-scale characterization of graphene on Ag(111)", Nature Communications, 4, 2804 (Nov. 15, 2013).

Li et al., "Chemically Derived, Ultrasmooth Graphene Nanoribbon Semiconductors", Science 2008, 319, 1229-1232.

Li et al: "One-pot synthesis of Ag nanoparticles/reduced graphene oxide nanocomposites and their application for nonenzymatic $H_2O_2$ detection", Electrochimica Acta, vol. 83, Aug. 10, 2012,pp. 283-287.

Li et al, "A facile fabrication of large-scale reduced graphene oxide-silver nanoparticle hybrid film as a highly active surface-enhanced Raman scattering substrate", J. of Materials Chemistry C., vol. 3, No. 16, Mar. 13, 2015, pp. 4126-4133.

Li et al., "Direction-Specific Interactions Control Crystal Growth by Oriented Attachment", Science 2012, 336, 1014-1018. (Abstract).

Liang et al., "Silver Nanowire Percolation Network Soldered with Graphene Oxide at Room Temperature and Its Application for Fully Stretchable Polymer Light-Emitting Diodes", ACS Nano. 2014, 8, 1590-1600 (Abstract).

Lim et al., "Facile Synthesis of Highly Faceted Multioctahedral Pt Nanocrystals through Controlled Overgrowth", Nano Lett., 2008, 8, 4043-4047.

Lipomi et al., "Skin-like Pressure and Strain Sensors Based on Transparent Elastic Films of Carbon Nanotubes", Nat. Nanotechnol. 2011, 6, 788-792.

Liz-Marzan and Pastoriza-Santos. "N, N-dimethylformamide as a reaction medium for metal nanoparticle synthesis", Adv. Funct. Mater. 2009, 19, 679-688.

Lui et al., "Ultraflat graphene", Nature 2009, 462, 339-341.

Mannsfeld et al., "Highly Sensitive Flexible Pressure Sensors with Microstructured Rubber Dielectric Layers", Nat. Mater. 2010, 9, 859-864.

Ovid'ko, "Metal-Graphene Nanocomposites with Enhanced Mechanical Properties: A Review", Rev. Adv. Mater. Sci., 38(2014), 190-200.

Park et al., "Colloidal Suspensions of Highly Reduced Graphene Oxide in a Wide Variety of Organic Solvents", Nano Lett. 2009, 9, 1593-1597.

Park et al., "Chemical Methods for the Production of Graphenes", Nat. Nanotechnol. 2009, 4, 217-224. (Advanced online publication).

(56) References Cited

OTHER PUBLICATIONS

Penn et al., Imperfect Oriented Attachment: Dislocation Generation in Defect-Free Nanocrystals. *Science* 1998, 281, 969-971.

Qin et al., "Thickness-Controlled Synthesis of Ultrathin Au Sheets and Surface Plasmonic Property", J. Am. Chem. Soc. 2013, 135, 12544-12547.

Si et al., "Exfoliated Graphene Separated by Platinum Nanoparticles", *Chem. Mater.* 2008, 20, 6792-6797.

Stoller et al., "Graphene-Based Ultracapacitors", Nano Lett. 2008, 8, 3498-3502.

Sun et al, "Shape-Controlled Synthesis of Gold and Silver Nanoparticles", Science 2002, 298, 2176-2179.

Tung et al., "High-Throughput Solution Processing of Large-Scale Graphene", Nat. Nanotechnol. 2009, 4, 25-29.

Worsley et al., "Synthesis of Graphene Aerogel with High Electrical Conductivity", *J. Am. Chem. Soc.* 2010, 132, 14067-14069.

Wu et al., "Surface Iodination: A Simple and Efficient Protocol to Improve the Isotropically Thermal Conductivity of Silver-Epoxy Pastes", Composites Science and Technology, 99 (2014) 109-116.

Xie et al., "Protein-Directed Synthesis of Highly Fluorescent Gold Nanoclusters", J. Am. Chem. Soc. 2009, 131, 888.

Xu et al., "Highly Conductive and Stretchable Silver Nanowire Conductors", Adv. Mater. 2012, 24, 5117-5122.

Xu et al., "Fabrication of Flexible Metal-Nanoparticle Film Using Graphene Oxide Sheets as Substrates", *Small* 2009, 5, 2212-2217.

Yang et al., "Reduction of Silver Nanoparticles onto Graphene Oxide Nanosheets with N,N-Dimethylformamide and SERS Activities of GO/Ag Composites", *J. Nanopart. Res.* 2011, 13, 5571-5581.

Yao et al., "Wearable Multifunctional Sensors Using Printed Stretchable Conductors Made of Silver Nanowires", *Nanoscale* 2014, 6, 2345-2352.

Yaul et al., A Flexible Underwater Pressure Sensor Array Using a Conductive Elastomer Strain Gauge, J. Microelectromechanical Systems, 21, 897, Aug. 2012.

Ying et al., "Silicon Nanomembranes for Fingertip Electronics", *Nanotechnology* 2012, 23, 344004.

Zhang et al: "One-pot green synthesis, characterizations, and biosensor application of self-assembled reduced graphene oxide-gold nanoparticle hybrid membranes", Journal of Materials Chemistry B, vol. 1, No. 47, Oct. 17, 2013, p. 6525.

Zhou et al., "Macroscopic Single-Crystal Gold Microflakes and Their Devices", Adv. Mater. 2015, 27, 1945-1950.

Zhou et al., "In Situ Synthesis of Metal Nanoparticles on Single-Layer Graphene Oxide and Reduced Graphene Oxide Surfaces", *J. Phys. Chem. C* 2009, 113, 10842-10846.

Zhu et al., "Exfoliation of Graphite Oxide in Propylene Carbonate and Thermal Reduction of the Resulting Graphene Oxide Platelets", *Acs Nano* 2010, 4, 1227-1233 (Published online ).

\* cited by examiner

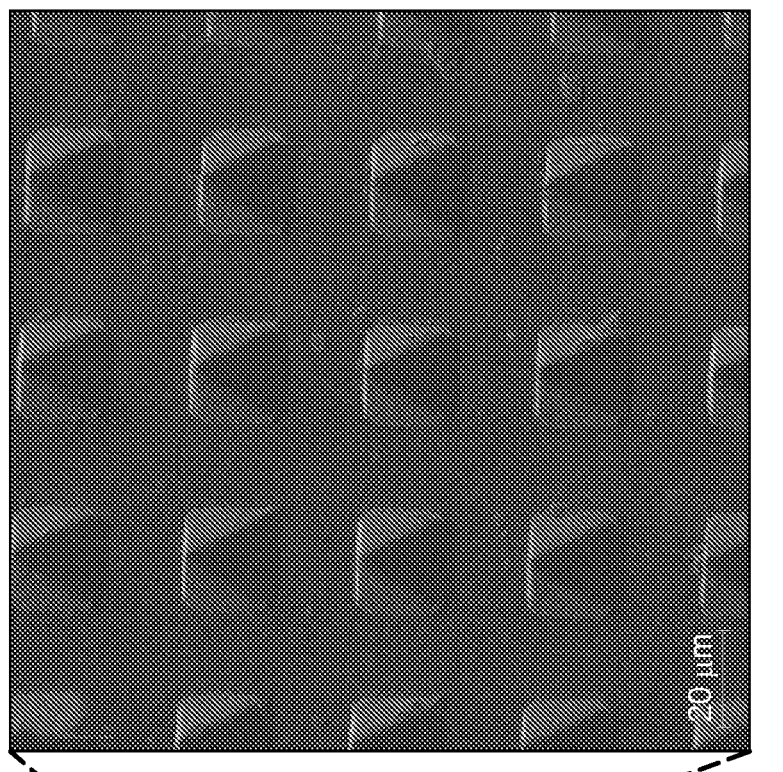
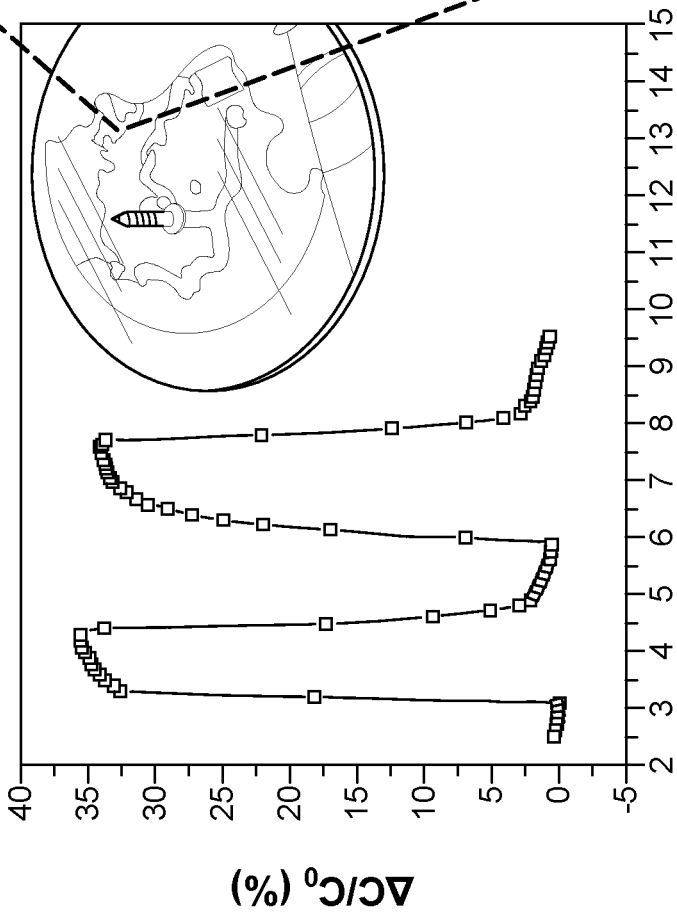
FIG. 8A
FIG. 8B

| AgNO₃ concentration | Reaction condition | Images |
|---|---|---|
| 60 mM | 110 °C for 16 h | |

FIG. 10B

| AgNO3 concentration | Reaction condition | Images |
|---|---|---|
| 1.2 M | 110 °C for 16 h ⊕ + ❄ | |

FIG. 10D

| AgNO₃ concentration | Reaction condition | Images |
|---|---|---|
| 2.4 M | 110 °C for 16 h ❄ |  |

COMPOSITIONS OF GRAPHENE MATERIALS WITH METAL NANOSTRUCTURES AND MICROSTRUCTURES AND METHODS OF MAKING AND USING INCLUDING PRESSURE SENSORS

CROSS REFERENCE TO RELATED APPLICATION

This is a national stage application of International Application No. PCT/IB2016/001174, filed internationally on Jul. 14, 2016, which claims priority to U.S. Provisional Application Ser. No. 62/194,097, filed on Jul. 17, 2015, both of which are incorporated by reference herein in their entireties.

RELATED APPLICATIONS

Priority is claimed to U.S. provisional application 62/194,097 filed Jul. 17, 2015 which is hereby incorporated by reference in its entirety for all purposes.

INTRODUCTION

Metal nanostructures have been widely used in catalysis[1], surface-enhanced Raman scattering (SERS)[2], bioimaging,[3] electronics and sensors[4-7], for example, due to their unique properties (cited references are listed hereinbelow). The intrinsic properties of metal nanostructures are mainly determined by their size, shape, composition, and crystallinity.[8] In the synthesis of metal nanomaterials, the structure with two-dimensional (2D) is very interesting to researchers, due to their higher specific surface and more active surface. The geometric design of 2D metal nanomaterials indicates that they may bear enhanced electrical, magnetic, and optic properties.[9] Many techniques have been developed to synthesize various one-dimensional (1D) nanomaterials, such as nanorods, nanotubes, nanobelts, and the like. However there have been a more limited number of reports on synthesis of 2D nanostructures, and there is a lack of through understanding of synthesis mechanism and systematic control over the synthesis process.

For example, Fang et al. used a replacement reaction to deposit silver plate with single crystallization in solution.[10,11] The thickness of the single silver plate is about 70 nm, and the length can reach to several micrometers. High silver ions concentration may be important for forming single crystalline silver dendrite or plate.[8] Very recently, Qi et al. used a periodically ordered structure of lamellar bilayer membranes and water as 2D template to synthesize single-crystalline gold nanosheets with large areas and thickness of several to tens of nanometers, which has a super surface plasmonic property.[12] Zhou et al. fabricated a stretchable sensing device based on macroscopic single-crystal gold microflakes, which exhibit a unique stain-controlling conductivity behavior. This new type of microflakes has potential applications in single-crystal electronics, sensing and imaging devices.[4]

As a very important 2D carbon material, fabrication of graphene sheets is actively pursued for applications in nano-electronics, sensors, nanocomposites, batteries, super capacitors and hydrogen storage due to its unique electrical and mechanical properties.[13-19] There are several known methods for preparing graphene. Among these, chemical reduction of graphene oxide is considered as a versatile method, possibly bringing large-scale production and functionalization.[20] Solvothermal reduction may be used in a wide range of applications due to its processable dispersion of reduced graphene oxide (RGO).[21,24] However, due to the prevalence of functional groups, the conductivity, one of the most important features of graphene, is relatively quite low.[22]

Hence, despite these advances in the art, better nanoscale and microscale materials are needed with better combinations of properties. Also needed are better methods of making these materials. Such advances would enable new and better applications, articles, and devices based on these kinds of engineered materials.

SUMMARY

Embodiments described herein include compositions, methods of making compositions, and methods of using compositions, as well as devices or articles comprising compositions. In addition, an apparatus can comprise the device or article.

Particularly important to what is described and claimed herein is a material which combines two two-dimensional materials into a single hybrid material.

For example, a first aspect broadly provides for a composition comprising: at least one graphene material, and at least one metal, as described further herein below in various aspects and embodiments. Alternatively, a first aspect provides for a composition consisting essentially of, or consisting of, at least one graphene material, and at least one metal.

A second aspect provides, more particularly, for a composition comprising: at least one graphene material comprising a plurality of layered graphene sheets; and at least one metallic microflake material intercalated within the graphene sheets of the graphene material. Alternatively, the second aspect provides for a composition consisting essentially of, or consisting of, at least one graphene material comprising a plurality of layered graphene sheets; at least one metallic microflake material intercalated within the graphene sheets of the graphene material.

A third aspect, more particularly, provides for a composition comprising: at least one graphene material comprising a plurality of layered graphene sheets; and at least one silver microflake material intercalated within the graphene sheets of the graphene material. A third aspect provides for a composition consisting essentially of, or consisting of, at least one graphene material comprising a plurality of layered graphene sheets; at least one silver microflake material intercalated within the graphene sheets of the graphene material.

A fourth aspect provides more particularly for a composition comprising single-crystal silver microflakes on reduced graphene oxide. Alternatively, a fourth aspect provides for a composition consisting essentially of, or consisting of, single-crystal silver microflakes on reduced graphene oxide.

In one embodiment, the graphene material is reduced graphene oxide.

In one embodiment, the metal is in the form of metal nanoparticles, metal microflakes, or a combination thereof.

In one embodiment, the graphene material comprises a plurality of layered graphene sheets, and the metal is intercalated within the graphene sheets of the graphene material.

In one embodiment, the metal is in the form of metal nanoparticles and metal microflakes.

In one embodiment, the metal is in the form of metal nanoparticles but not metal microflakes.

In one embodiment, the metal is in the form of metal nanoparticles, optionally also with metal microflakes, and the metal nanoparticles have an average particle diameter of about 2 nm to about 250 nm.

In one embodiment, the metal is in the form of metal nanoparticles, optionally also with metal microflakes, and the metal nanoparticles have an average particle diameter of about 50 nm to about 150 nm.

In one embodiment, the metal is silver. Both the metal nanoparticles and the metal nanoflakes can be silver.

In one embodiment, the metal is in a form which includes single crystal metal microflakes.

In one embodiment, the metal is in a form which includes metal microflakes which have an average thickness of about 10 nm to about 500 nm.

In one embodiment, the metal is in a form which includes metal microflakes, and a majority of the metal microflakes is in the form of individual layers. In another embodiment, the metal is in a form which includes metal microflakes, and a majority of the metal microflakes is in the form of multiple layers.

In one embodiment, the metal is in a form which includes metal microflakes, and the metal microflakes have an average length of at least one micron.

In one embodiment, the metal is in a form which includes metal microflakes, and the metal microflakes are in dendritic form.

In one embodiment, the amount of metal is 1 wt. % to 99 wt. %, and the amount of graphene material is 1 wt. % to 99 wt. % relative to the total amount of solid content in the composition.

In one embodiment, the composition has an electronic conductivity of at least $7 \times 10^5$ S/cm.

In one embodiment, the composition is in the form of a film, sheet, or membrane.

In one embodiment, the composition further comprises at least one additional component. For example, in one embodiment, the composition further comprises at least one polymer. In another embodiment, the composition further comprises at least one dispersant.

In addition, various articles or devices are provided and can be made which comprise the compositions described herein. The composition can be in solid form at 25° C.

In one embodiment, the article comprises the composition described herein in the form of a film, sheet, or membrane. The composition can be an electrode.

In one embodiment, the article is a sensor. In one embodiment, the article is a pressure sensor.

In one embodiment, the article comprises at least one matrix material in which the composition described herein is embedded.

In one embodiment, the article comprises at least one polymeric matrix material in which the composition described herein is embedded.

In one embodiment, the article comprises at least one elastomeric polymeric matrix material in which the composition described herein is embedded.

In one embodiment, the article comprises a matrix material in which the composition described herein is embedded, and the matrix material is patterned.

In one embodiment, the article comprises at least one matrix material in which the composition described herein is embedded, wherein the composition described herein is in the form of two separated films, sheets, or membranes.

Another embodiment is a kit comprising at least one composition and/or article as described herein.

Also provided are methods of using the compositions described herein. These methods include the various devices and articles described herein including method of use as a sensor or pressure sensor.

Also provided are methods of making the compositions described herein.

One embodiment is a method of forming a composition as described herein, the method comprising: preparing a reaction mixture comprising (i) at least one graphene material; (ii) at least one precursor for the metal; and (iii) a solvent or dispersant system; reacting the reaction mixture under conditions sufficient to form the composition described herein. These conditions include, for example, agitation of reaction mixture, reaction temperature, and reaction time.

One embodiment provides that the reacting step includes a reduction of the precursor of the metal to the metal. For example, silver ion can be reduced to silver metal.

Another embodiment is a method further comprising the step of isolating the composition described herein from the reaction mixture.

Another embodiment is a method further comprising the step of isolating the composition as described herein from the reaction mixture by filtration. The composition can be further dried.

Another embodiment is a method which is a "one pot" preparation method (synthesis carried out in a single reaction container or vessel).

Another embodiment is wherein the solvent or dispersant system comprises a major solvent or dispersant component having a relatively high boiling point, e.g., boiling point of at least 150° C.

The solvent or dispersant system can comprise one or more solvents or dispersants which are liquid at 25° C. In another embodiment, the solvent or dispersant system comprises a major solvent or dispersant (e.g., over 50 wt. %) which is a reducing solvent or dispersant.

The concentration of the (ii) precursor for metal can be varied to control the composition structure. There is no particular upper or lower limit to concentration, as it can vary with the system, but the concentration can be, for example, 1 mM to 10 M. In another embodiment, the concentration of the (ii) precursor for the metal is at least 12 mM. In another embodiment, the concentration of the (ii) precursor for the metal is at least 60 mM. In another embodiment, the concentration of the (ii) precursor for the metal is at least 120 mM. In another embodiment, the concentration of the (ii) precursor for the metal is at least 1.2 M. In another embodiment, the concentration of the (ii) precursor for the metal is at least 2.4 M.

In another embodiment, the concentration of the (ii) precursor for the metal is sufficiently high enough to cause creation of metal microflakes in the composition described herein.

In another embodiment, the graphene material is reduced graphene oxide (RGO). In another embodiment, the graphene material is reduced graphene oxide (RGO) which is prepared by heating a graphene material precursor in the solvent or dispersant system. In another embodiment, the graphene material is reduced graphene oxide (RGO) which is prepared by heating a graphene material precursor in a solvent or dispersion system at temperature of at least 150° C.

In another embodiment, the (ii) precursor for the metal is a metal salt. In another embodiment, the (ii) precursor for the metal is a silver salt.

In another embodiment, the reaction mixture is reacted by heating to at least 100° C.

In another embodiment, the solvent or dispersant system comprises a major solvent or dispersant which is a polar aprotic solvent such as NMP.

While metal represents a preferred embodiment, due to its high conductivity, metal oxide can also be formed in some cases if desired. Conversion of metals to metal oxides is known. Hence, a composition can comprise both the graphene material, the metal, and metal oxide. In some cases, the composition can comprise the graphene material and the metal oxide.

Various advantages can flow from one or more embodiments described herein. For example, an advantage for at least some embodiments is high electronic conductivity combined with good flexibility and good durability. High sensitivity, durable pressure sensors can be made in some embodiments. The method of synthesis can be simple and low cost. In addition, the morphology of the metal can be adapted based on the synthetic method in some embodiments. Compared with one-dimensional (1D) structures, two-dimensional (2D) structures as described herein for at least some embodiments can have higher specific surface and more active surface, which can bring faster electron transfer, stronger mechanical property, and better extensibility along 2D plane. Based on these advantages, 2D metal nanomaterials can obtain unique electrical, magnetic and optical properties controlled by their geometric features.

Additional summary information is provided for working examples and preferred embodiments. As described more hereinbelow, 2D structural graphene sheet in preferred embodiments was used as template to in situ synthesize silver micro-flakes on reduced graphene oxide, with thickness around one hundred nanometers and length about several to tens of micrometers. While the claimed inventions are not limited by theory, the oriented attachment mechanism apparently dominates the silver crystal growth and self-assembling of reduced silver units to form single-crystal silver microflake (AgMF) structure in RGO sheets. Hence, reduced graphene oxide/silver micro-flake (RGO/AgMF) hybrid membrane can be prepared in situ by one-pot synthesis. In preferred embodiments, N-methyl-2-pyrrolidone (NMP) is a powerful solvent for dispersing carbon nanotube, graphene, and graphene oxide (GO) with a high boiling point (202° C.) that facilitates its use for solvothermal reduction in open systems. In preferred embodiments, NMP was successfully used to reduce silver ions and graphene oxide simultaneously or at least in the same reaction vessel under high temperature. Silver micro-flakes (AgMF) intercalated homogeneously in RGO layers, forming an interconnected network with high conductivity.

In preferred embodiments, interestingly at higher silver ion concentration, 2D silver micro-flakes were formed on the surface of RGO sheets in addition to silver nanoparticles (AgNP). In preferred embodiments and working examples, a one-pot solvothermal method has been developed to successfully reduce $AgNO_3$ and GO simultaneously, or at least in the same reaction vessel, to RGO/Ag hybrid membrane. Silver nanoparticles (AgNP) were observed first on the surface of reduced graphene oxide (RGO) when adding a smaller amount of silver nitrate into solution. With increasing silver nitrate concentration in solvent and extending reduction time at high temperature, dendritic silver microflakes (AgMF) could be obtained. While not limited by theory, the oriented attachment mechanism was used to describe the AgMF formation in RGO sheets. AgMFs intercalated homogeneously between RGO/AgNP layers, and formed a large network in the hybrid membrane. Both of AgNP and AgMF were composed of pure crystalline silver. RGO/AgMF membrane showed an excellent conductivity, $7.5 \times 10^5 S \cdot m^{-1}$, which is very close to neat silver.

Contrary to nanowires, micro-flakes are two dimensional and thus can intercalate better within the polymer matrix to provide an enhanced network for electron movement. In a working example, this hybrid was used as an electrode to fabricate a reliable pressure sensor using a polymeric elastomer, which can afford a fast response time and is extremely sensitivity to pressure. For example, flexible copolymer SIS (styrene-isoprene-styrene thermoplastic elastomer) can be used. This pressure sensitivity can retain, for example, more than 4.7 $MPa^{-1}$ after 10,000 cycles. The inventive design, in preferred embodiments, proved functional for monitoring various actions such as wrist movement, squatting, walking, and delicate or simple finger touch with high durability. Thus, in preferred embodiments, this system can be prepared by a simple fabrication processes, and its application can be extended to, for example, touch screen panels, robotic systems, and prosthetics. Finally, in order to improve the sensitivity of the sensor, the patterned Si wafer served as the mold for fabricating SIS thin film with pyramid nanostructure. The enhanced sensor has higher sensitivity to very low pressure (50 Pa).

BRIEF DESCRIPTION OF THE DRAWINGS

Preferred embodiments and/or working examples are described more in the following drawings.

FIG. 8. (a) Capacitance sensitive to light weight loading. Inset figure shows a small screw (0.1 g) on the surface of patterned RGO/AgMF/SIS sensor. (b) SEM images of the patterned SIS thin film with square pyramids arrays.

FIGS. 10a-10e. Micro images of RGO/AgMF(AgNP) membrane with different AgNO$_3$ concentration added. Reduction occurred at 110° C. for 16 h, and RGO concentration is 2.0 mg·mL$^{-1}$.

DETAILED DESCRIPTION

Introduction

Figure 1:
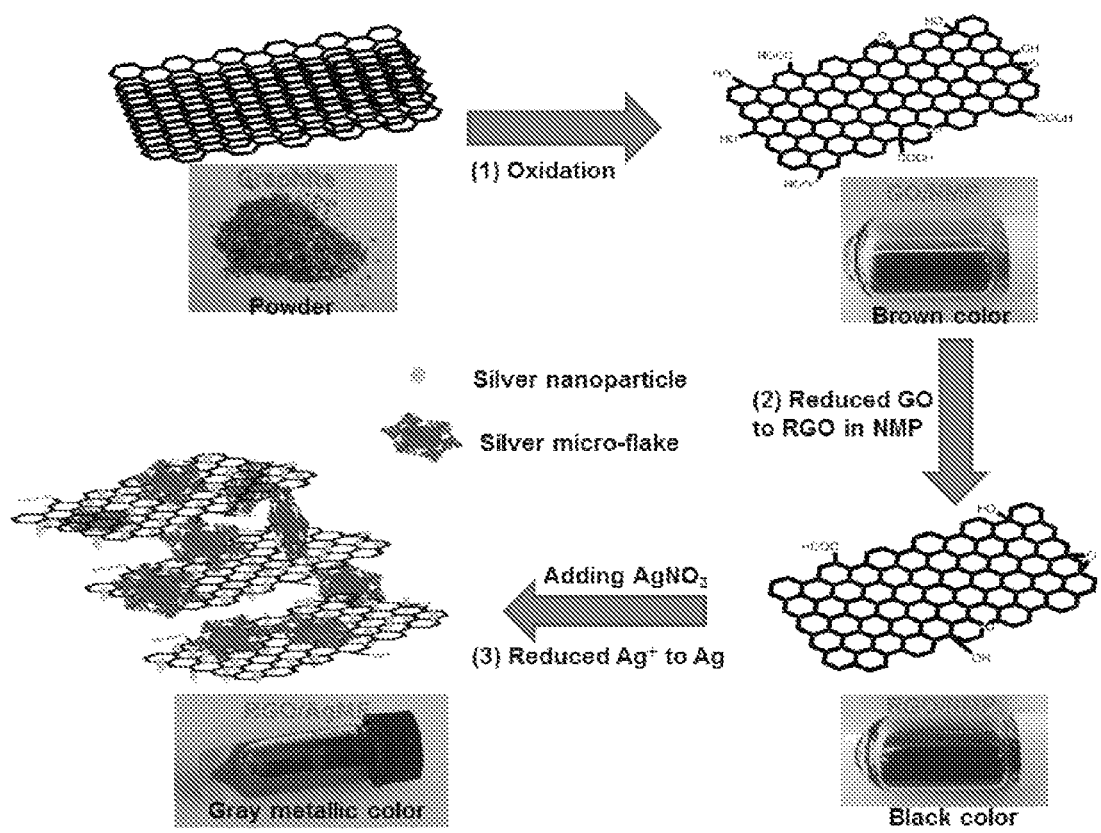
FIG. 1. Schematic representation of one-pot synthesis of RGO/AgMF membrane.

Priority U.S. provisional application 62/194,097 filed Jul. 17, 2015 is hereby incorporated by reference in its entirety for all purposes, including working examples, figures, claims, and supporting description.

All references cited herein are incorporated by reference. No admission is made that any reference cited herein is prior art.

In embodiments, described herein, the open-ended term "comprising" or "comprises" can be replaced in some embodiments by one of the partially closed terms "consisting essentially of," or "consists essentially of," or one of the closed terms "consisting of," or "consists of."

As indicated above and in the following claims and working examples, a series of aspects and embodiments are provided and claimed, which are described in more detail hereinbelow.

Graphene Material

Graphene materials are known in the art. See, for example, R. Mertens, *The Graphene Handbook,* 2015 Ed. and (Ed. V. Georgakilas) *Functionalization of Graphene,* 2014; N. Koratkar, *Graphene in Composite Materials,* 2013; and (Eds. C. N. R. Rao, A. K. Sood), *Graphene,* 2013. Graphene can come in various forms including sheets, flakes, graphene oxide, nanoplatelets, ribbons, inks, and composites. Graphene materials include materials having two dimensional graphene sheets but not in the form of a one-dimensional carbon nanotube material and not being a traditional graphite material. Rather, graphene can be prepared by exfoliation of graphite to form graphene sheets. Graphene materials can comprise a plurality of layered graphene sheets which can be intercalated as known in the art. The spacing between the graphene sheets can be varied and need not be the same as the spacing between graphite sheets.

Graphene oxide (GO) is a lead example of a graphene material which can be reduced to form reduced graphene oxide (RGO) as known in the art. See, for example, U.S. Pat. Nos. 8,993,113; 9,045,346; 9,053,868; 9,057,639; and 9,064,778 for examples of graphene oxide being used in the art. See also non-patent references cited herein. Graphene oxide can include graphene which is functionalized with oxygen components such as hydroxyl, carboxylic acid, ether, epoxy, and ketone functional groups. It can be prepared by modified hummers method. Graphene material can include both a precursor material such as, for example, GO and the reacted or reduced derivative form of the precursor material such as, for example, RGO.

Graphene materials can be solution processable and can be reduced in solution or as thin films. Electronic conductivity can increase with reduction.

Herein, for example, the graphene material can be intercalated with a metallic material including, for example, a metal microflake and/or a metal nanoparticle material, including, for example, a silver microflake and/or a silver nanoparticle material. The metal microflake and/or nanoparticle material can be substantially homogeneously distributed throughout the graphene material. The material can be called a composite, a microcomposite, or a nanocomposite. See Ovid'ko, *Rev. Adv. Mater. Sci.,* 38(2014), 190-200, describing metal-graphene composites. The combination of a graphene material with highly conductive metals such as silver is particularly of interest. See Kiraly et al., *Nature Communications,* 4, 2804 (Nov. 15, 2013) for teachings about growing graphene on silver.

Metal Including Nanoparticles and/or Microflakes

Metals are, of courses, known in the art including, for example, alkali metal, an alkaline earth metal, a lanthanum, an actinium, a transition metal, a post-transition metal, a metalloid, and the like. Specific examples include but are not limited to Ni, Si, Ti, Cr, Mn, Fe, Co, Cu, Sn, In, Pt, Mg, Cu, Au, or Ag. Monometallic or bimetallic nanoparticles and microflakes can be used. Combinations of two or more metals can be used including alloy compositions.

A metal as known in the art can be in the form of a particle or flake, including a microparticle or a microflake and also including a nanoparticle or a nanoflake. One skilled in the art can distinguish between a metal microflake and a metal nanoparticle based on, for example, size and shape. In some cases, metal nanoparticles can be fused to microflakes.

Microflakes, for example, are shaped like a flake and are micron-sized. Metal microflakes including silver microflakes are known in the art. For example, silver microflakes are used in electrically conductive adhesives (ECSs). Composites have been made comprising micron-sized silver flakes, multi-walled carbon nanotubes, and silver nanoparticles. See Chun et al., *Nature Nanotechnology,* 5, 853-857 (2010). Silver microflakes are also noted in Wu et al., *Composites Science and Technology,* 99 (2014) 109-116. The microflake can be anisotropic in form.

In one embodiment, the metallic microflake material is a silver or gold metallic microflake material. In another embodiment, the metallic microflake material is a silver metallic microflake material.

In one embodiment, the composition further comprises metallic nanoparticles in addition to the microflakes. In one embodiment, the composition further comprises silver nanoparticles and the microflake material is a silver microflake material.

In one embodiment, the metallic microflake material is a single crystal microflake material.

In one embodiment, the composition is crystalline.

In one embodiment, the metallic microflake material is a silver metallic microflake material which is a single crystal silver metallic microflake material.

In one embodiment, the metallic microflake material has an average length of at least one micron, or at least two microns, or at least three microns, or at least four microns, or at least five microns, or at least ten microns, or at least twenty microns. There is no particular upper limit on the length.

In one embodiment, the metallic microflake material has an average thickness of about 10 nm to about 500 nm, or about 10 nm to about 250 nm, or about 50 nm to about 150 nm.

The metallic microflakes can be in the form of individual layers and/or also in the form of multiple layers. In one embodiment, a majority of the metallic microflake material is in the form of individual layers. In one embodiment, a majority of the metallic microflake material is in the form of multiple layers.

In one embodiment, the metallic microflake material is in dendritic form. The microflakes can have branching and/or fractal structures.

The microflakes can be substantially homogeneously distributed and can form network structures.

In some cases, the microflakes can present a flat enough surface to provide for measurement of a surface planar area. The surface planar area can be, for example, 1 or more square microns, or 10 or more square microns, or even 100 or more square microns.

The morphology of the metal microflakes, particularly silver microflakes, is described more in the following working examples.

In one embodiment, the metal is in the form of metal nanoparticles, optionally also with metal microflakes, and the metal nanoparticles have an average particle diameter of about 2 nm to about 250 nm, or about 2 nm to about 50 nm, or about 50 nm to about 250 nm, or about. The nanoparticles are more spherical in shape compared to a nanowire or a nanotube or other one dimensional forms.

The morphology of the metal nanoparticles can be controlled and can be, for example, spherical, cubic, clubbed, or dendritic.

The metal of the nanoparticle and the metal of the microflake can be the same. For example, the metal of the nanoparticle and the metal of the microflake can each be silver.

Additional morphological features of the composition, including the graphene material and the metal, can be found in the working examples.

Amounts

The relative amounts of the graphene composition, the metal, and any other components of the composition can be adapted by one skilled in the art. For example, one can change the amount of the graphene material and metal precursor. The amount of the graphene composition, and the amount of the metal, can be each 1 wt. % to 99 wt. %, or 10 wt. % to 90 wt. %, or 20 wt. % to 80 wt. %, or 30 wt. % to 70 wt. %, or 40 wt. % to 60 wt. %, or about 50 wt. % relative to the total weight of solid components.

In one embodiment, the composition comprises, consists essentially of, or consists of the graphene material and the metal material. For example, over 75 wt %, or over 85 wt. %, or over 95 wt. % of the composition is the graphene material and the metal material. In other embodiments, at least one other component is present in substantial amounts such as a dispersant or a polymer matrix.

Properties of the Composition

The composition can have high electronic conductivity as measured by methods known in the art. For example, electronic conductivity a can be at least about $10^3$ S/m, or at least about $10^4$ S/m, or at least about $10^5$ S/m, or at least about $10^6$ S/m. The conductivity can reasonably approach that of the conductivity of the pure or neat metal form. For example, as shown in the working examples, the conductivity of the RGO/AgMF membrane was $7.5 \times 10^5$ S/m. The conductivity of neat silver is $6.3 \times 10^7$ S/m. In considering the unexpectedly good ratio of conductivity of the composition to the conductivity of the pure metal, one can also consider the percent weight of the graphene component. A composition which is 75 wt. % graphene would be expected to have a lower conductivity than a composition which is only 25 wt. % graphene. The working examples demonstrate an unexpectedly high increase (more than 100-fold) in electronic conductivity in, for example, the RGO/AgMF membrane compared to RGO/AgNP membrane.

The conductivity can vary with strain.

The compositions can also display a much higher Raman intensity which indicates a good SERS property.

The composition also can be flexible and used in flexible structures. The composition can be folded, rolled, or bent.

The composition usefully can also be linked to other conductive structures using, for example, conductive adhesives such as silver paste.

Applications

The compositions described herein can be used in a variety of applications including applications noted in the Introduction for metal nanostructures and for graphene. Applications which rely on good electronic conductivity are of interest including electrode applications. Applications include but are not limited to catalysis, SERS, smart material applications, biological (e.g., antibacterial) applications, chemical applications, and electrical applications, including sensing, imaging (including bioimaging), and single crystal electronics. Other examples include touch screen panels, robotic systems, and prosthetics.

In pursuing these and other applications, an article, device, apparatus, and the like can be provided which comprises the compositions as described herein.

Pressure or Strain Sensors

Pressure or strain sensors, including pressure sensors using polymers or conductive elastomers are generally known in the art. See, for example, Yaul et al., *J. Microelectromechanical Systems*, 21, 897, August 2012; Cochrane et al., *Sensors*, 2010, 10, 8291; and Choong et al., *Adv. Mater.*, 26, 21, 3451, 2014. The pressure sensor can be, for example, a capacitive pressure sensor. The compositions can be used as electrodes including used in parallel plate embodiments.

One particularly important method of use or application area is with pressure sensors which can be flexible and highly sensitive. Various motions of humans or robots can be monitored such as, for example, monitoring wrist movement, detecting the changing of different finger touch, and other human motions such as walking, squatting, and knee bending.

Elastomers are generally known in the art and include, for example, silicones (including polydimethylsiloxane, PDMS), polyurethanes, isoprene or rubber materials, and the like. Elastomers can be formed from crosslinked materials which feature low glass transition temperatures but are crosslinked. Block copolymers can be used. In the working examples, SIS is used.

Methods of Making

Also provided herein are methods of making the inventive compositions. The methods can be batch, semi-continuous, or continuous. A "one-pot" method can be used. Here, a single reaction vessel can be used in a relatively simple, efficient process. The method can be called a solvothermal method.

Graphene precursors such as graphene oxide can be used as reactant. The metal precursor can be, for example, a metal salt. For silver, for example, silver nitrate can be used. Metal salts including silver salts are well-known in the art.

A solvent or dispersant system can be used, wherein it may not matter whether the liquid solvent fully dissolves or merely disperses a component. For purposes herein, solvent and dispersant are used interchangeably to the extent that functional use such as suspension, dispersion, and/or processing can be achieved.

The solvent or dispersant system can include one or more organic solvents including higher boiling organic solvents and aprotic organic solvents. Examples include N,N-dimethylformamide (DMF), N,N-dimethylacetamide (DMAC), and N-methyl-2-pyrrolidinone (NMP). One solvent can be a major solvent and comprise over 50 wt. %, or over 80 wt. %, or over 90 wt. % of the solvent system. The boiling point of the solvent can be 150° C. or more, or 200° C. or more. The solvent can be a reducing solvent and aid in the reduction of precursors (e.g., conversion of GO to RGO metal salt cations to metal, e.g., silver nitrate to silver).

The concentrations of the different components can be varied. For example, the concentration of the graphene material in the solvent or dispersant can be, for example, 0.2 to 20 mg/mL or 0.5 to 10 mg/mL, or 1 to 5 mg/mL.

The concentration of the metal precursor can be adapted to change the form or morphology of the metal upon reduction. For example, the concentration of the metal precursor can be at least 12 mM, or at least 60 mM, or at least 120 mM, or at least 1.2 M, or at least 2.4 M. With increasing metal precursor concentration in solvent and extending reduction time, metal microflakes can be obtained. One skilled in the art can vary the concentration, reaction time, and other experimental parameters to make the desired composition and particular morphologies.

The reaction time can be varied from those times noted in the working examples below. Reaction time can be, for example, at least 1 hour, or at least 5 hours, or at least 10 hours.

The reaction temperature can be adapted for the solvent being used but can be, for example, 100° C. or more, or 150° C. or more.

Embodiments described herein also include the compositions produced and defined by the described methods of making.

Working Examples

Additional embodiments are provided in the following non-limiting working examples.

The fabrication process of RGO/AgMF hybrid membrane is illustrated in FIG. 1. Briefly, a solution of GO in NMP was heated at 180° C. for 1 hour under air to which silver nitrate ($AgNO_3$) was added after the solution cooled down. The mixture was then heated to 110° C. until the original black solution color turned into metallic gray. The successful reductions of GO to RGO and $Ag^+$ to Ag were confirmed by Energy-dispersive X-ray spectroscopy (EDX), (X-ray diffraction) XRD, Raman and thermogravimetric analysis (TGA) (FIG. 9).

Figure 2A:
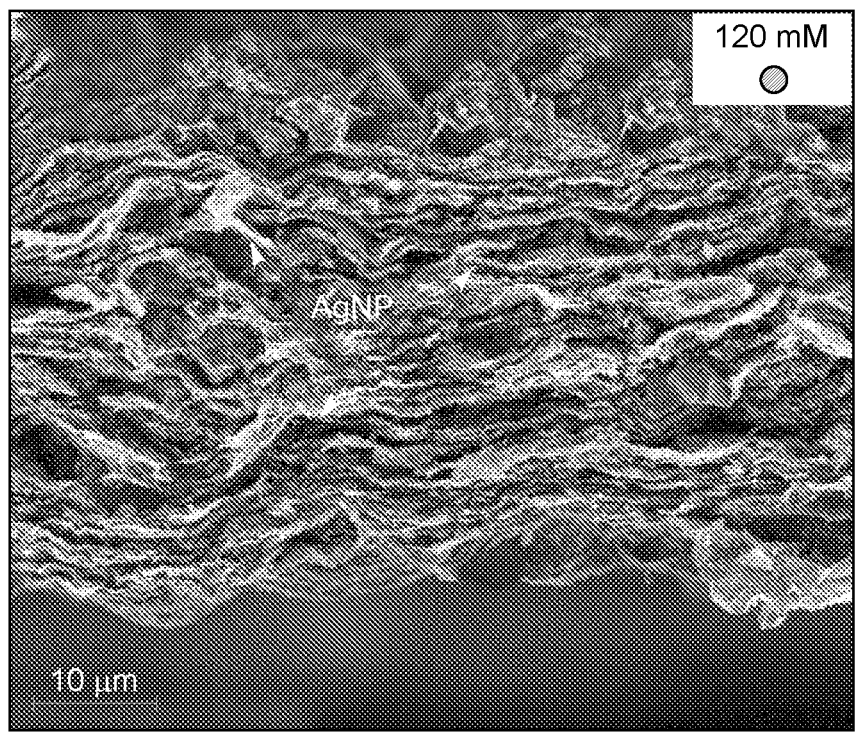
FIG. 2. SEM images of the RGO/AgNP and RGO/AgMF membrane with different $AgNO_3$ concentration. (a) 120 mM; (b) 1.2 M; (c, d) 2.4 M. Inset TEM image shows the dendritic AgMF structure intercalated in RGO layers. Reduction occurred at 110° C. for 16 h; RGO concentration in NMP is 2.0 $mg \cdot mL^{-1}$.
Figure 2B:
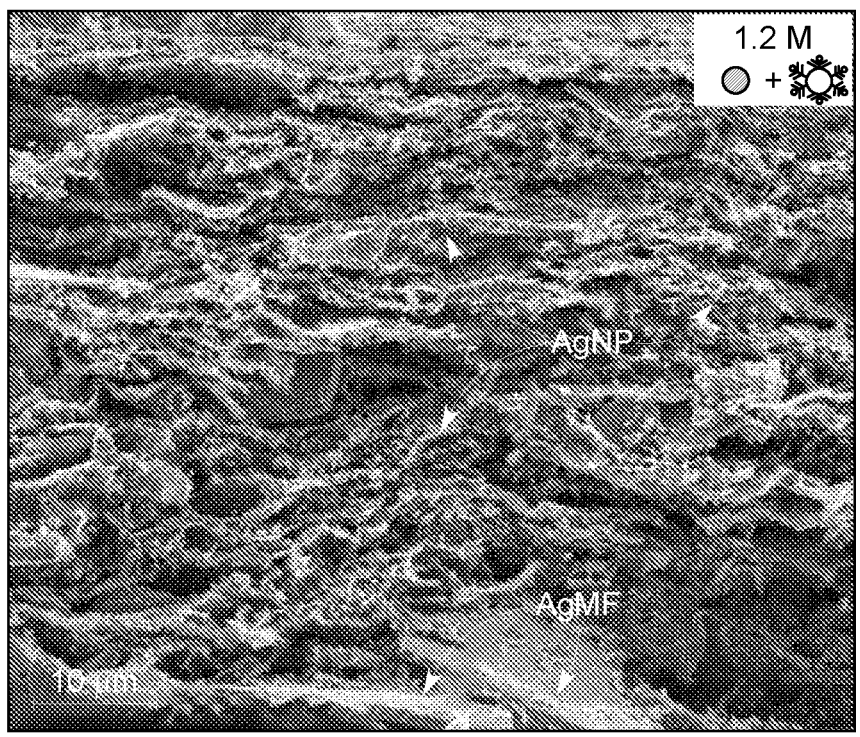
Figure 2C:
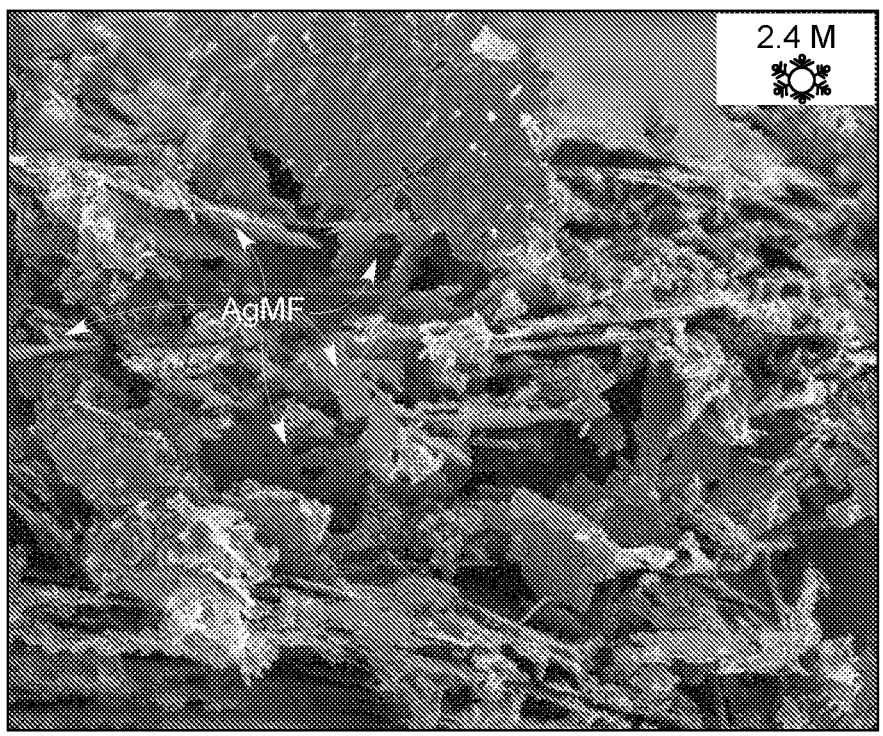
Figure 10A:
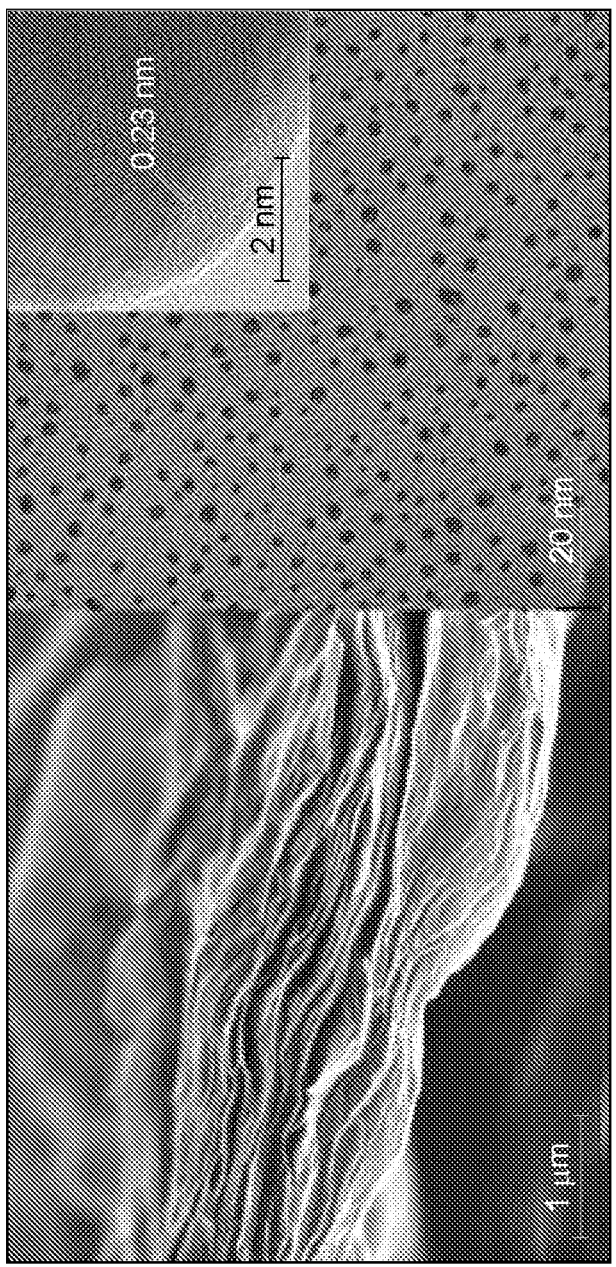

Interestingly, varying the concentration of $AgNO_3$ used afforded different nanostructures of silver ranging from nanoparticles at low concentration to predominantly microflakes at high concentration (FIG. 2a-c). RGO membrane with low $AgNO_3$ concentration (12 mM) showed a similar morphology to a plain RGO sheet as the obtained AgNP were dispersed uniformly on the sheet (FIG. 10a). The nanoparticles were spherical and have an average particle size of 6-9 nm, and the lattice-fringe from HRTEM study is measured to be 0.23 nm which corresponds to the (111) crystal plane of silver crystallite as indicated in the inset of the figure (FIG. 10a). Increasing the concentration to 60 mM afforded nanoparticles with an average size of 70 nm and increased the distance between the RGO sheets (FIG. 10b).

Figure 10C:
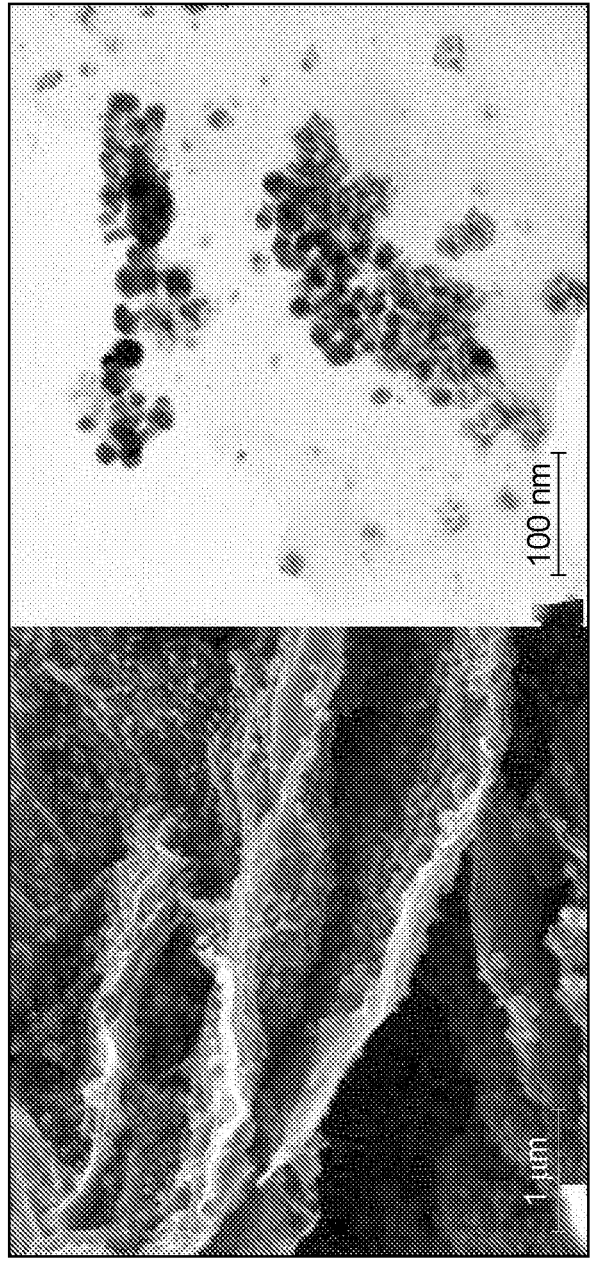

The size of AgNPs increased further with increasing the concentration of $AgNO_3$ to 120 mM without any dramatic change in the membrane's previous morphology (FIG. 2a, FIG. 10c).

Increasing $AgNO_3$ concentration to 1.2 M and heating at 110° C. for several hours afforded a metallic gray solution. SEM studies showed that AgMF were predominantly formed and intercalated between RGO sheets with smaller AgNP still present as well (FIG. 2b, FIG. 10d).

Figure 10E:
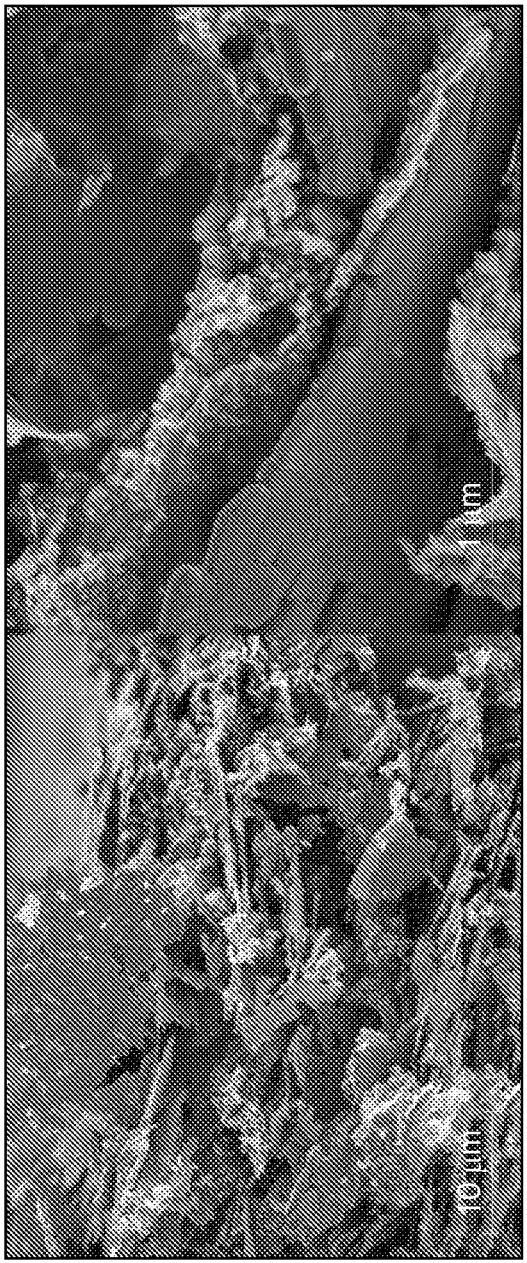

The intercalated AgMF became larger with further increasing $AgNO_3$ concentration to 2.4 M (FIG. 2c, FIG. 10e).

Figure 2D:
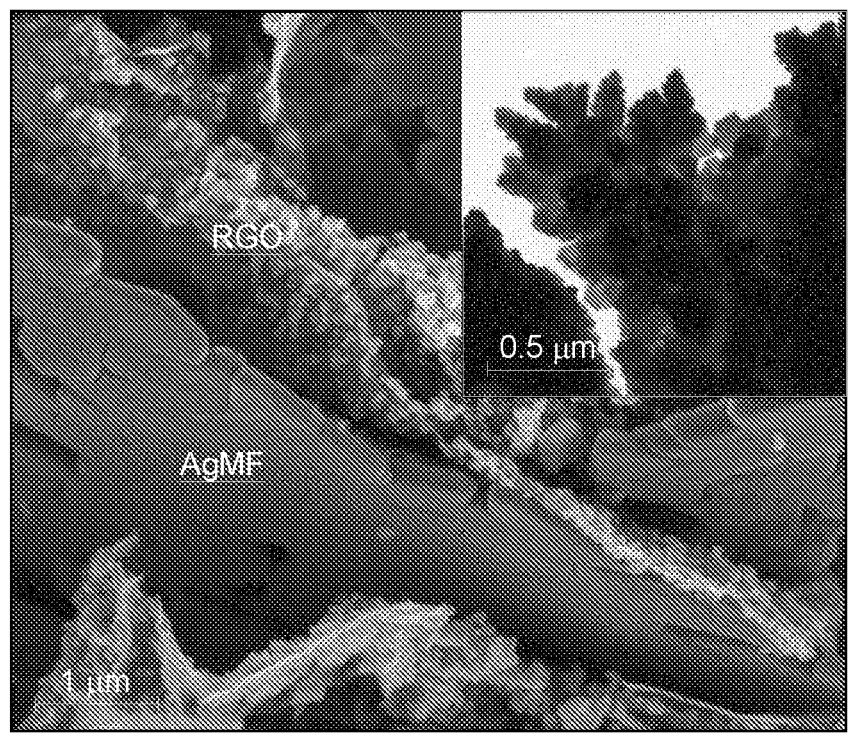

Investigating the morphology of RGO/AgMF hybrid membranes at high concentration, the continuous RGO sheets were replaced by RGO/AgMF network (FIG. 2d).

Figure 3:
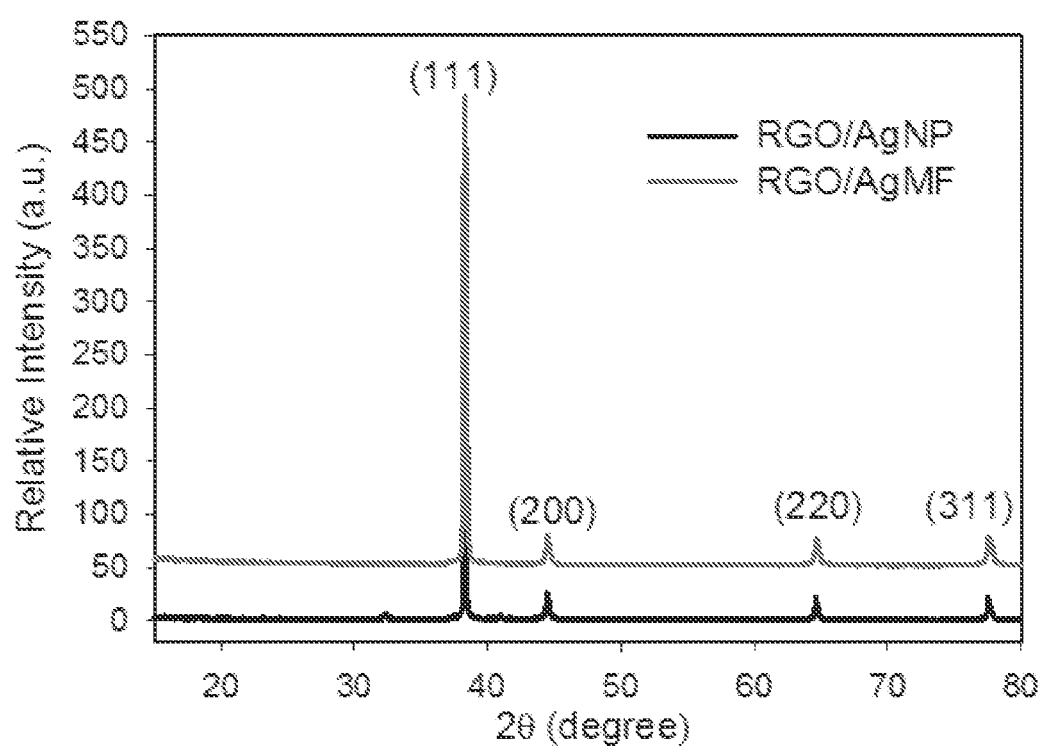
FIG. 3. XRD pattern of RGO/AgNP and RGO/AgMF. Reduction occurred at 60° C. and 110° C. for 16 h respectively; $AgNO_3$ concentration is 60 mM and 2.4 M in RGO solution respectively.

The crystalline feature of the synthesized hybrid membranes was confirmed by recording the XRD pattern. As shown in FIG. 3, the XRD patterns of RGO/AgNP and RGO/AgMF show sharp peaks which are indexed to the diffraction from the (111), (200), (220), and (311) of fcc silver. A refined lattice parameter is extracted from the XRD data to be 2.36 Å, which agrees with the HRTEM result (FIG. 10a). This indicated that both of AgNP and AgMF were composed of pure crystalline silver. It should note that the intensity ratio of (200) and (111) diffraction peaks for RGO/AgMF (1/55) is much lower than RGO/AgNP (1/5), the conventional value for silver particle is 0.061/0.33 (JCPDS card file, 4-783). This observation indicated that the AgMF are primarily dominated by (111) facets, showing an orientated growth of AgMF on their (111) planes, in agreement with other reports.[11,23] The obtained AgMF have the size of about several micrometers, and present both individual layer and multiply layers in structure.

Figure 4A:
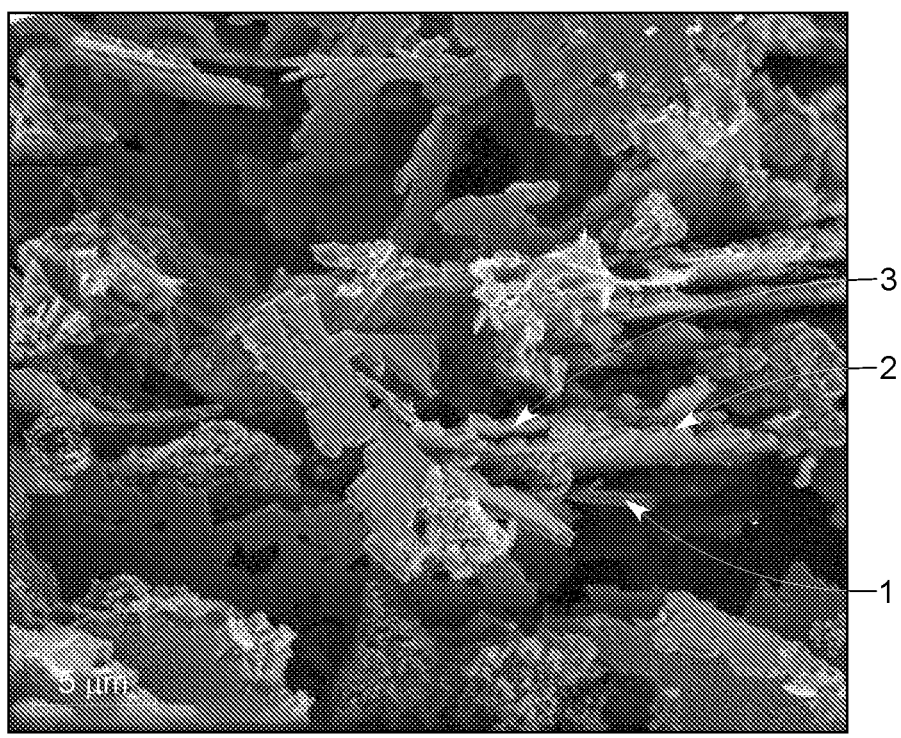
FIG. 4. (a,c,d) SEM images of RGO/AgMF membrane, (b) TEM image of RGO/AgMF membrane. Number 1-4 indicated the different layer of multiply AgMF structure.
Figure 4B:
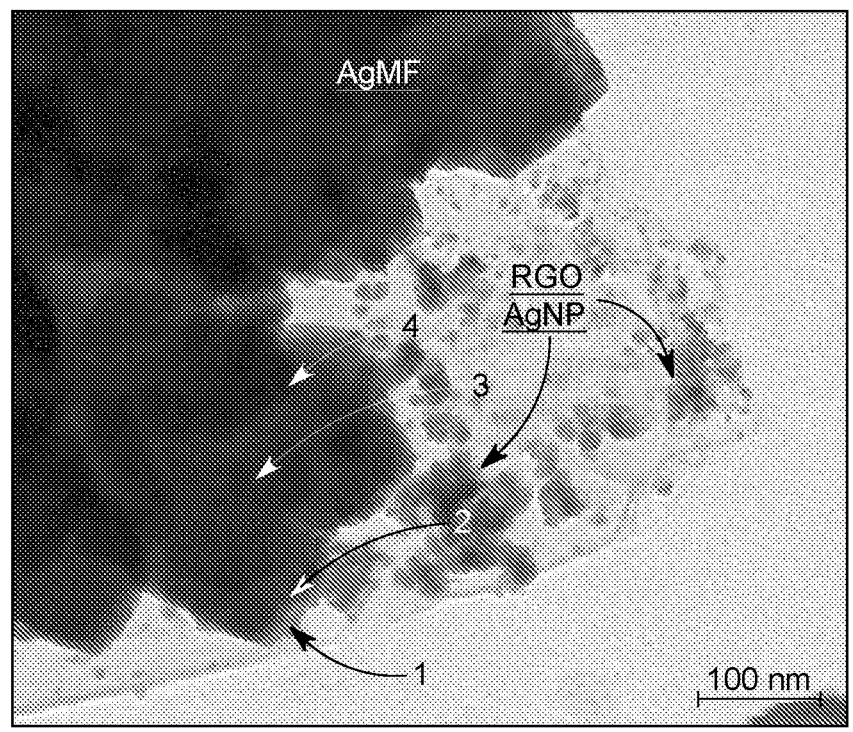
Figure 4C:
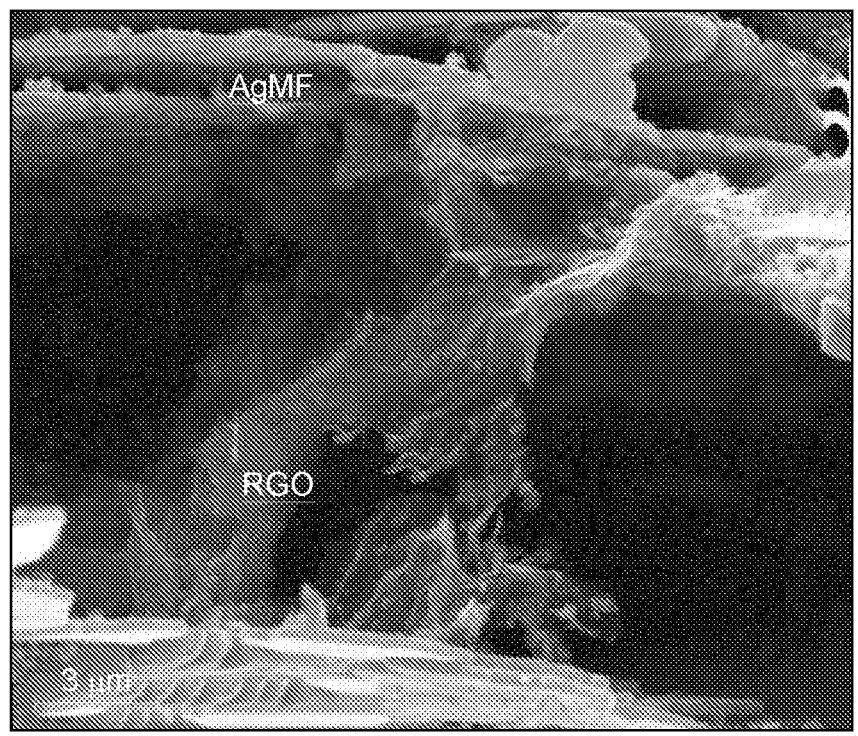
Figure 4D:
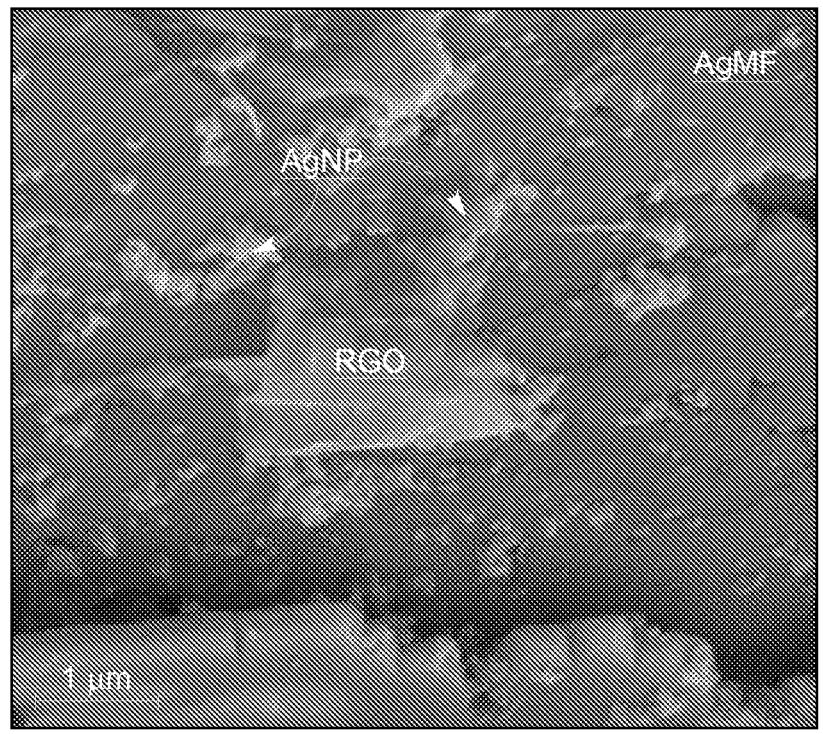

As shown in FIGS. 4a and 4b, the number of 1-3 or 1-4 showed that the multiply structure of AgMF is composed 3 or 4 AgMF monolayers. The thickness of single AgMF was about 90-110 nm. Individual AgMF was found intercalated in RGO layers and connected with each other. Meanwhile, RGO acted as a bridge between AgMF layers forming a continuous network (FIG. 4c), which provide a very high conductivity and strong capacitance for electron transfer. Even in multiply AgMF layers, it was observed that RGO sheets adhered to AgMF surface, as well as the aggregates of AgNP (FIG. 4d).

Figure 11A:
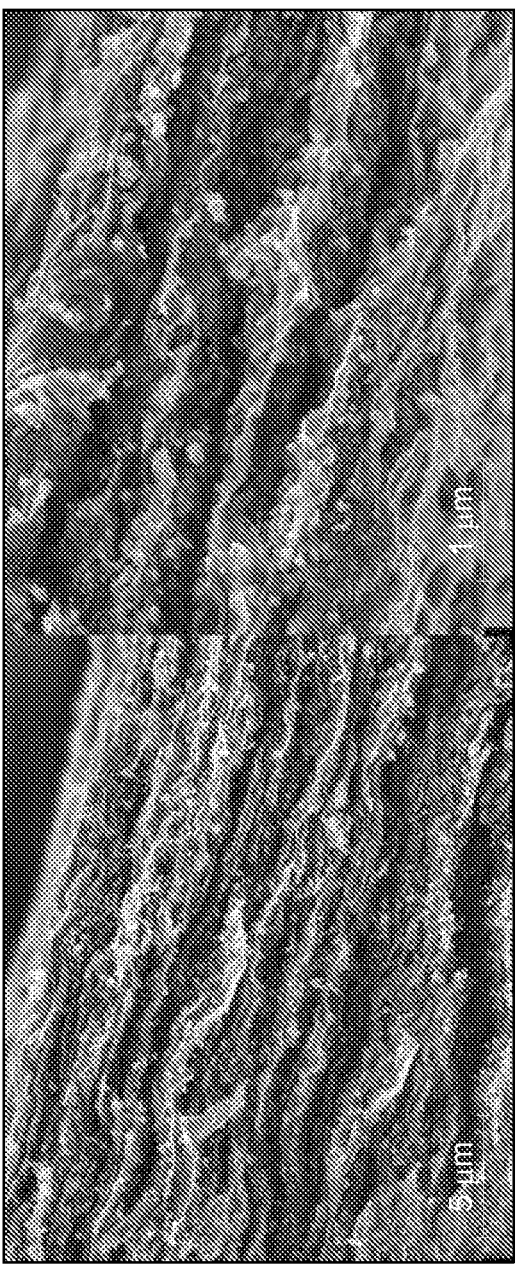
FIG. 11a-11c. Micro images of RGO/AgMF(AgNP) membrane with same AgNO$_3$ concentration added and different reduction condition; RGO concentration is 2.0 mg/mL.
Figure 11B:
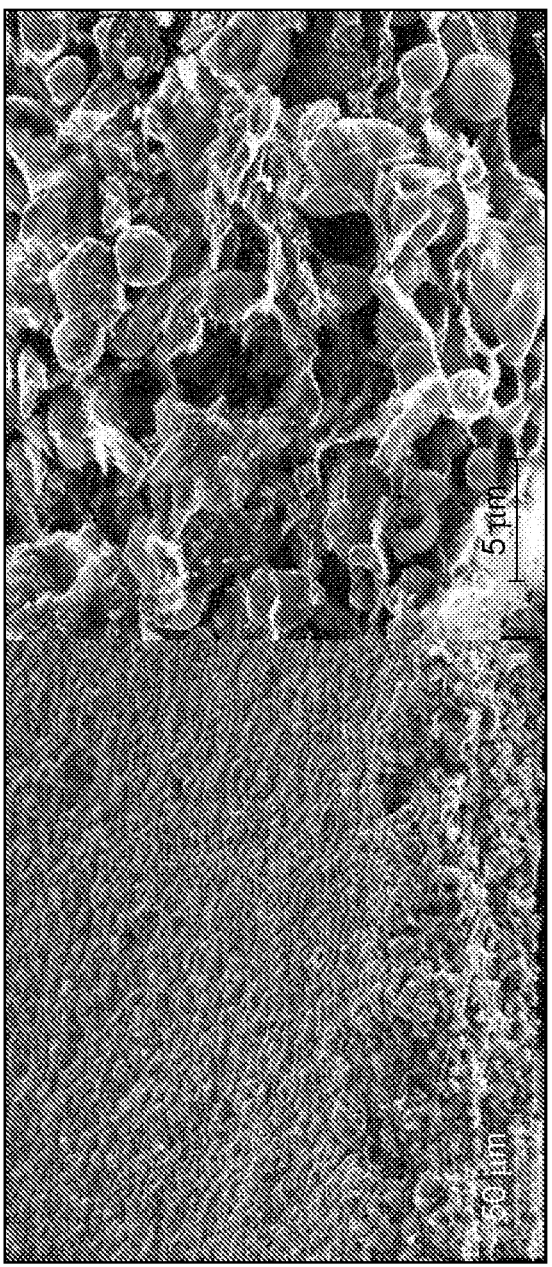
Figure 11C:
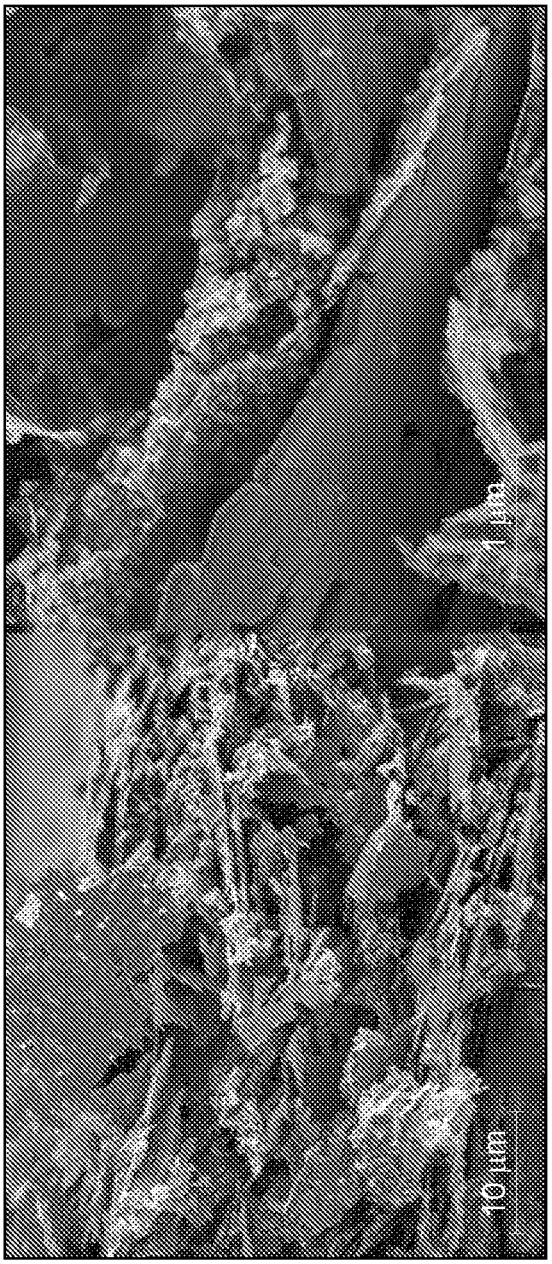

To optimize the conditions of AgMF formation in RGO/NMP solution, different silver ions concentrations, reaction times and temperatures were investigated (FIG. 5, FIG. 10, FIG. 11). It was concluded that AgMF could not be obtained at low silver ions concentration, low temperature and short reaction times, and thus, while the claimed inventions are not limited by theory, it was hypothesized that the mechanism of AgMF formation depends on the silver ions concentration and the behavior of NMP at high temperature. The oxygen-containing functional groups in RGO can catch the metal ions and metal nanoparticles to form metal chelate.[24,25] These oxygen species are distributed on the surface of RGO and contribute to a negatively charged surface. When AgNO$_3$ was added into RGO/NMP solution, these functional groups on RGO would provide active sites to absorb the positive silver ions. The exfoliated RGO sheets could also serve as a large support surface to disperse the Ag$^+$ ions. So in situ reduction of Ag$^+$ ions allowed AgNPs to distribute uniformly and anchor onto RGO nanosheets. Meanwhile, NMP also takes a very important role in reducing Ag$^+$ to Ag. NMP was oxidized to form a peroxide species in the presence of heating, and the peroxide further transformed NMP to 5-hydroxy-N-methyl-2-pyrrolidone which acted as a reducing agent for reducing Ag$^+$ to Ag.[26]

Figure 5A:
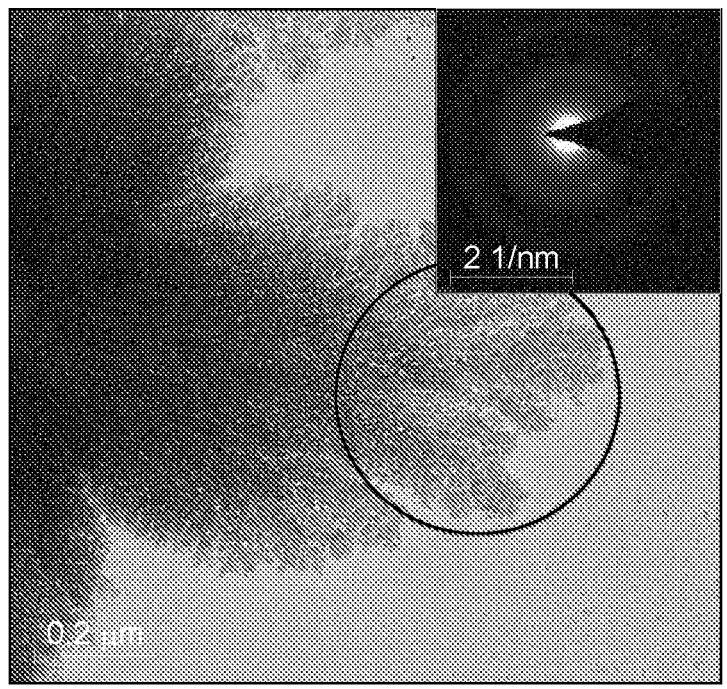
FIG. 5. TEM images of AgMF at different silver ions concentrations, reaction times and the insets are SAED for marked areas: (a) 1.2 M for 10 min at 110° C., (b) 1.2 M for 30 min at 110° C., (c) 1.2 M for 5 h at 110° C., (d) 2.4 M for 5 h at 110° C.
Figure 5B:
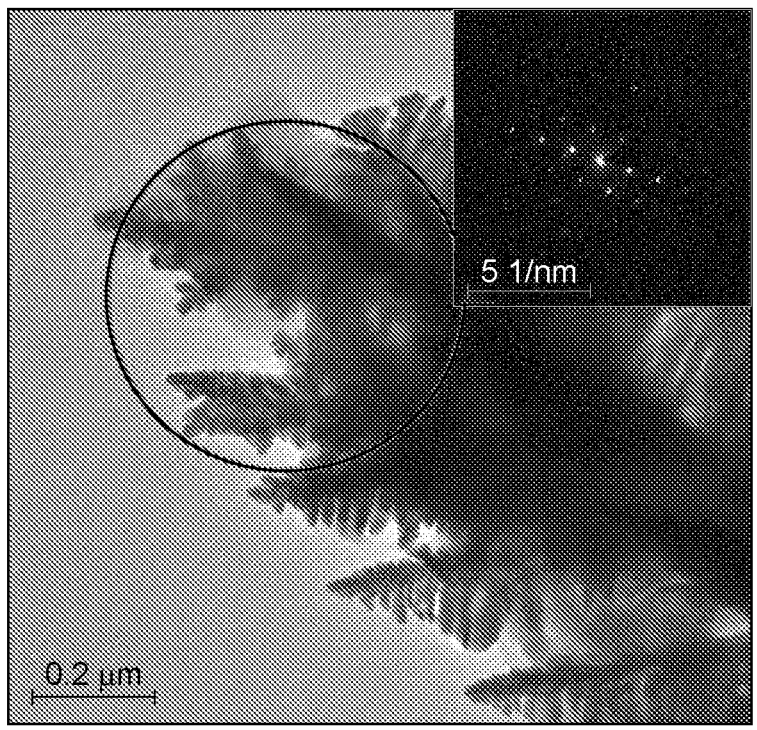
Figure 5C:
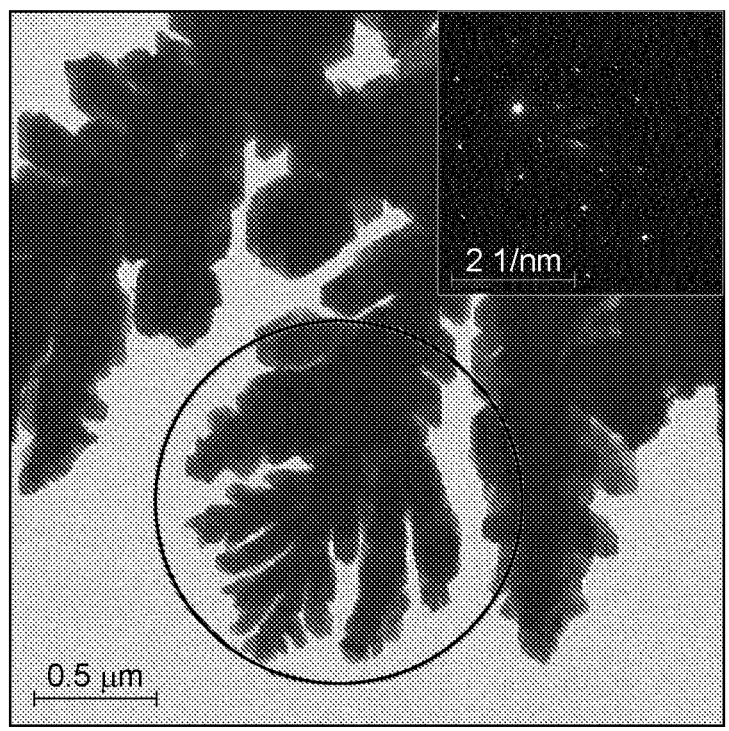
Figure 5D:
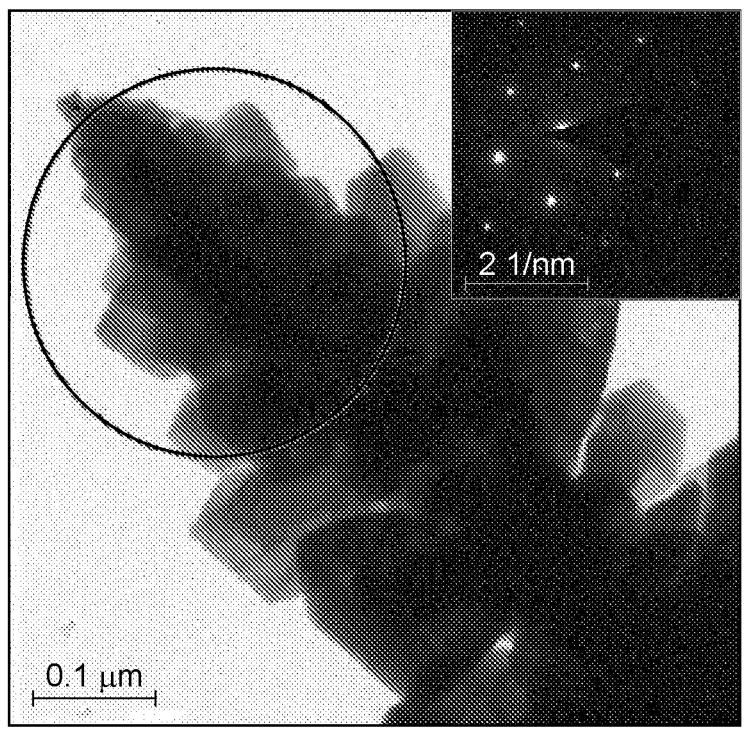
Figure 12A:
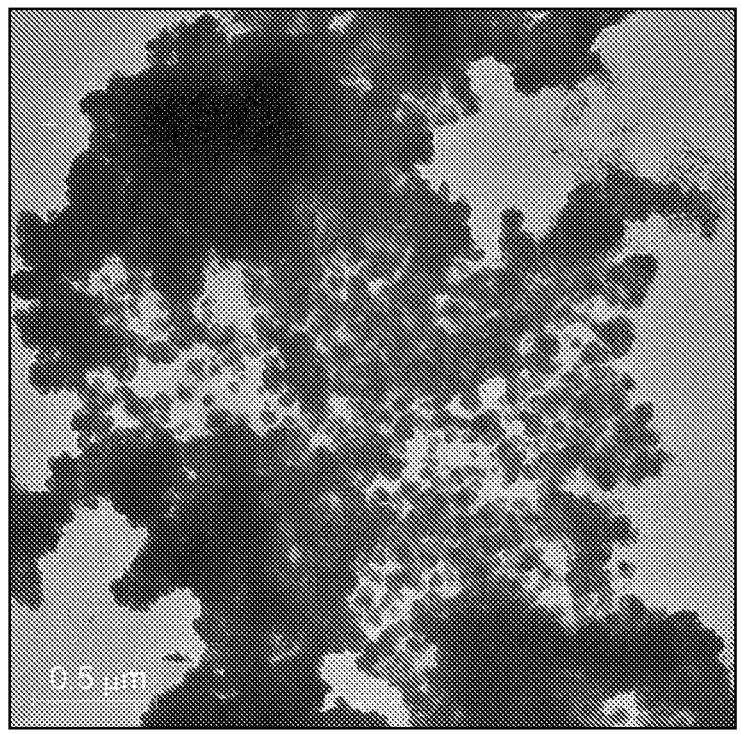
FIG. 12. TEM images of silver dendrites, demonstrating the morphological transition from fractal to flake growth for silver aggregates at different reduction time: (a) reduction occurred at 110° C. for 30 min; (b) reduction occurred at 110° C. for 2 h. AgNO$_3$ concentration: 2.4 M; RGO concentration: 2.0 mg·mL$^{-1}$.
Figure 12B:
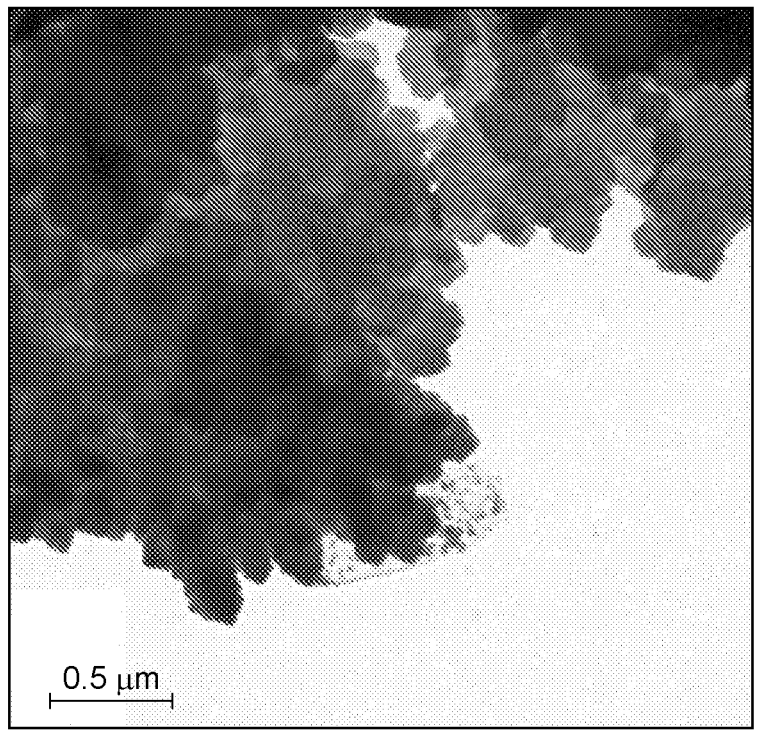
Figure 13:
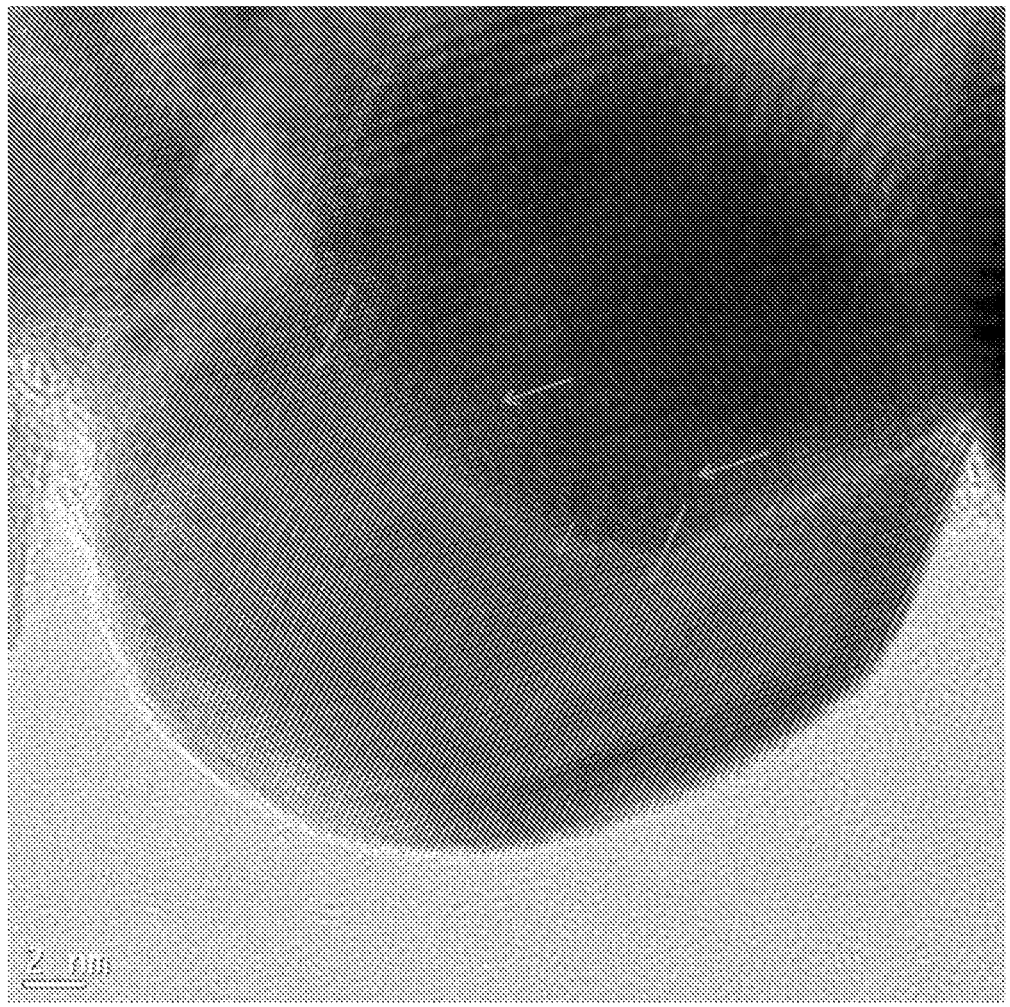
FIG. 13. HRTEM images of a local part for dendritic AgMF. AgNO$_3$: 1.2 M; RGO: 2.0 mg·mL$^{-1}$; Reduction occurred at 110° C. for 30 min.
Figure 14:
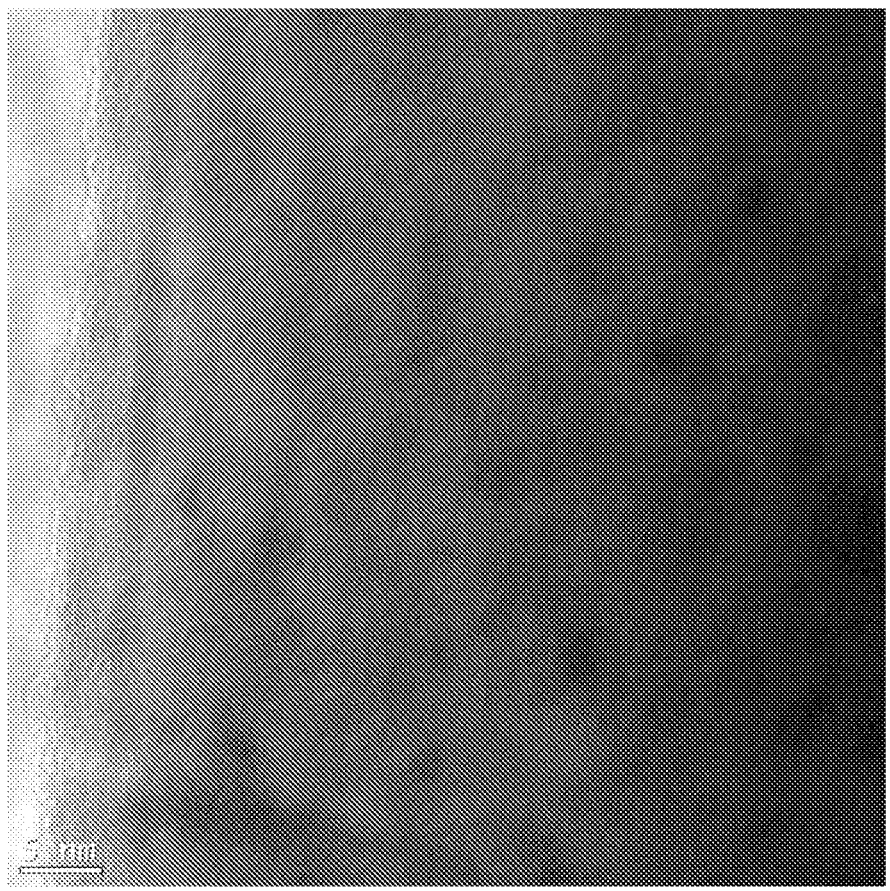
FIG. 14. HRTEM images of dendritic AgMF. AgNO$_3$: 1.2 M; RGO: 2.0 mg·mL$^{-1}$; Reduction occurred at 110° C. for 16 hours.

When a small amount of AgNO$_3$ was added into RGO/NMP solution at a low temperature such as 60° C., the Ag$^+$ ions were absorbed onto the RGO surface and in situ reduced to AgNP. With increasing the reaction time, the AgNP size became larger (FIG. 10a, FIG. 10b). When a larger amount of AgNO$_3$ was added into RGO/NMP solution at a low temperature, there was not enough reducing agent for reducing Ag$^+$ ions. At this temperature, NMP can't be oxidized enough, and the reducing action was mostly happened on RGO surface. Therefore, the in situ-reduction of Ag$^+$ ions on the RGO surface is mainly responsible for AgNP formation, and it grew with time or self-assembly to big nanoball structure (FIG. 11b), which is in agreement with previous report.[23] When the temperature was heated to 110° C., many oxidized NMP molecules existed in solution as reducing agents. When AgNO$_3$ was added, the reduction of Ag$^+$ ions was fast, it can happen in solvent and RGO surface. Due to the fast move of reducing agents in solvent and the attractive interaction between metal ions, the silver particles aggregate together to form a large size, which are the original shape of dendritic structure (FIG. 5a, FIG. 11a). It has been confirmed that oriented attachment (OA) mechanism is a major path for silver dendrite formation.[27,28] FIG. 13 showed the HRTEM image of the attachment of different silver nanoplates. From the crystalline orientation of the boundary between two adjoining particles, it was found that after attaching each other, silver plate has an orientated growth. These observations indicate that the OA mechanism dominates the self-assembling of building units, involving attachment, realignment, and finally form a single crystal AgMF structure. This OA crystal growth is controlled by direction-specific interactions.[29] The morphologies and structures of Ag nanocrystal are influenced by silver ions concentration and reducing time.[8] With increasing reaction time, the sliver particles grew to bigger size, and connected each other completely to form a dendritic particle (FIG. 5b-5d, FIG. 11b). The concurrent presence of high silver ions concentration and more reducing species may cause silver to further aggregate and be reduced to the mesocrystal structure of dendritic micro-flake. The SAED patterns in FIG. 5 showed the morphological transition from fractal of nanoball aggregates with poor crystallinity (FIG. 5a) to single crystalline silver dendrite (FIG. 5c,5d). FIG. 12 showed that the branch tips converted their round shape to hexagonal structure. Residual AgNP could be clearly seen on the silver flake surface (FIG. 14).

While the claimed inventions are not limited by theory, all of the above results support the hypothesis that AgNP are possibly aggregating followed by further growth to afford the dendritic micro-flake structure. In addition, the 2D structure of graphene sheets may also take a role in the formation of RGO/AgMF network structure. The gaps between graphene sheets provided a space for silver particle connected each other to form flake structure. And this short distance also restricts the growth of flakes along the 2D plane of graphene sheet.

Figure 15:
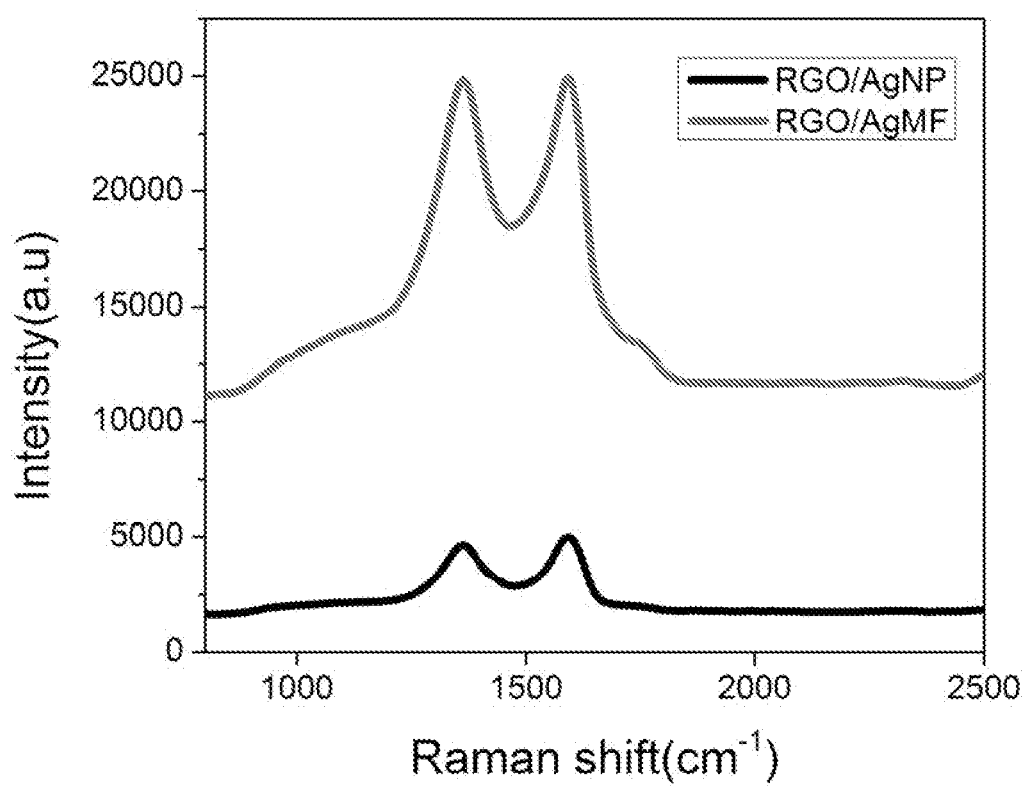
FIG. 15. Raman spectrum of RGO/AgNP and RGO/AgMF. Reduction occurred at 60° C. and 110° C. for 16 h respectively; AgNO$_3$ concentration is 2.4 M in RGO solution.

In these experiments, it was found that RGO/AgMF membrane displayed a much higher Raman intensity than RGO/AgNP membrane (FIG. 15), indicating that RGO/AgMF has a better SERS property. The hybrid RGO/AgMF membrane shows excellent conductivity of $7.5 \times 10^5$ S·m$^{-1}$ which is very close to the neat silver value of $6.3 \times 10^7$ S·m$^{-1}$ at room temperature and extremely higher than RGO/AgNP membrane (Table I).

TABLE I

Electrical conductivity of RGO, RGO/AgNP and RGO/AgMF membrane.

| Membrane | Electrical conductivity/S · m$^{-1}$ |
|---|---|
| RGO | 86 |
| RGO/AgNP | 138 |
| RGO/AgMF | 7.5 × 10$^5$ |
| Silver | 6.3 × 10$^7$ |

Pressure Sensor

Figure 6A:
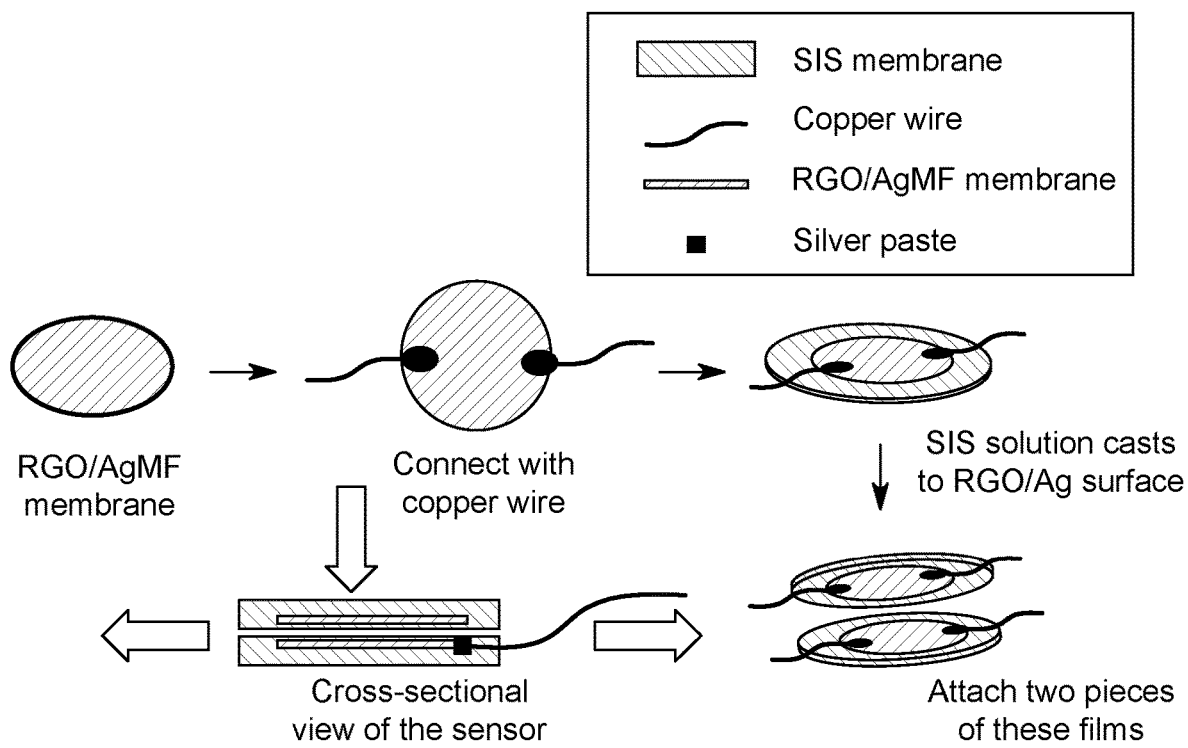
FIG. 6. (a) Schematic illustration of the fabrication of a pressure sensor; (b) Photo image of the fabricated sensor being folded; (c) Schematic showing a capacitive pressure sensor with RGO/AgMF layer as the electrodes (top) before and (bottom) after applying pressure.
Figure 6B:
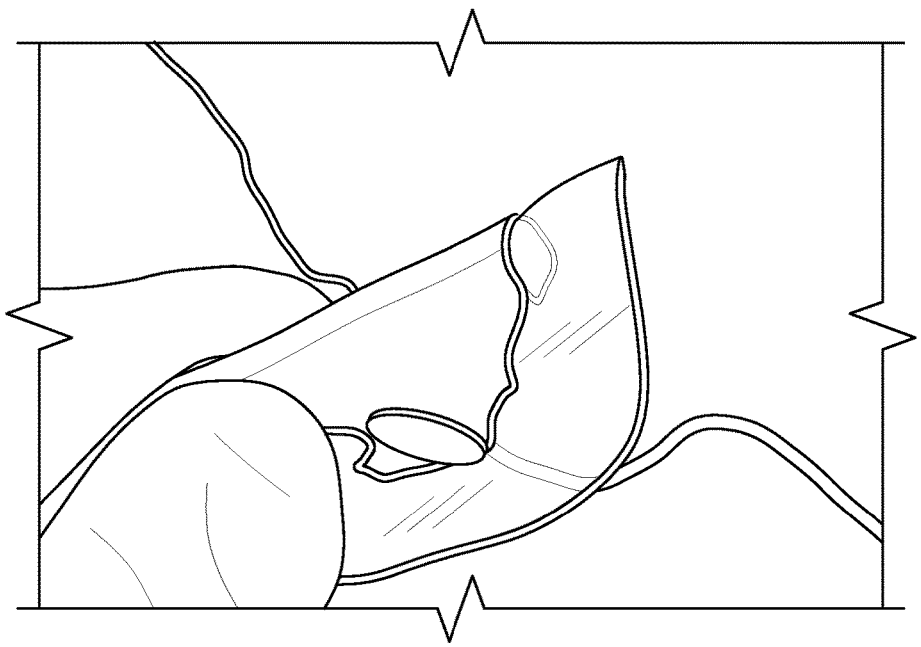

The highly conductive RGO/AgMF membrane was then embedded in SIS to readily fabricate flexible and sensitive pressure sensors as shown schematically in FIG. 6a. Specifically, in a glass dish, a copper wire was connected to the RGO/AgMF membrane using silver paste followed by adding SIS solution (SIS in DCM) to completely intercalate the hybrid membrane. The solution was then dried to form a film which was later peeled off from the glass dish, and two pieces of RGO/AgMF based membranes were attached together with RGO/AgMF side face to face. We should note that each piece of this composite is an excellent flexible conductor by itself (FIG. 6b). As a proof of concept, a simple circuit to power a light-emitting diode (LED) was constructed and the resistance was measured to be 3.57Ω when the membrane was flat. Folding the membrane many times did not affect the illumination while the resistance changed slightly to about 3.72Ω.

Figure 6C:
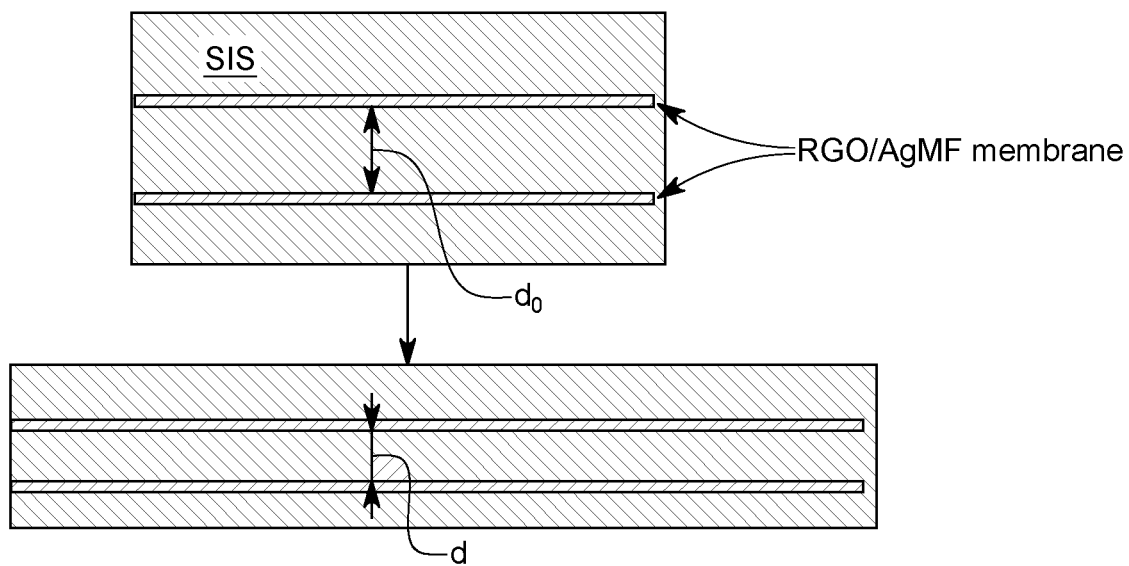
Figure 7A:
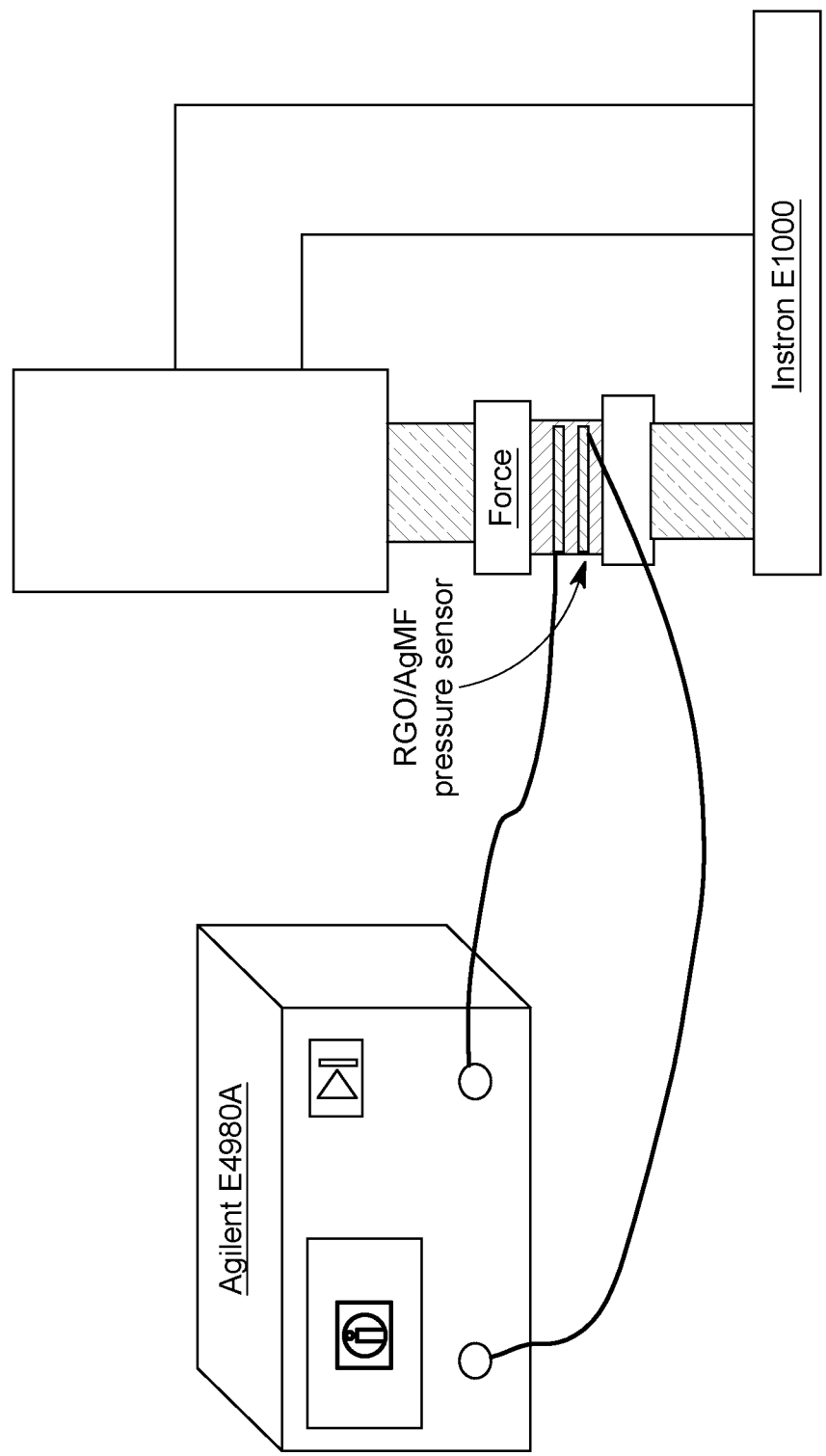
FIG. 7. (a) Schematic illusion of the experimental setup. (b) Sensitivity after repeated loading-unloading cycles at a frequency of 5 Hz. (c) Relative capacitance changes with wrist movement. (d) Relative capacitance changes with various human actions: walking, squatting and knee bending. (e) Relative capacitance changes with different finger touch mode; finger pad touch, finger touch with pressing and proximity mode, fingertip touch.
Figure 7B:
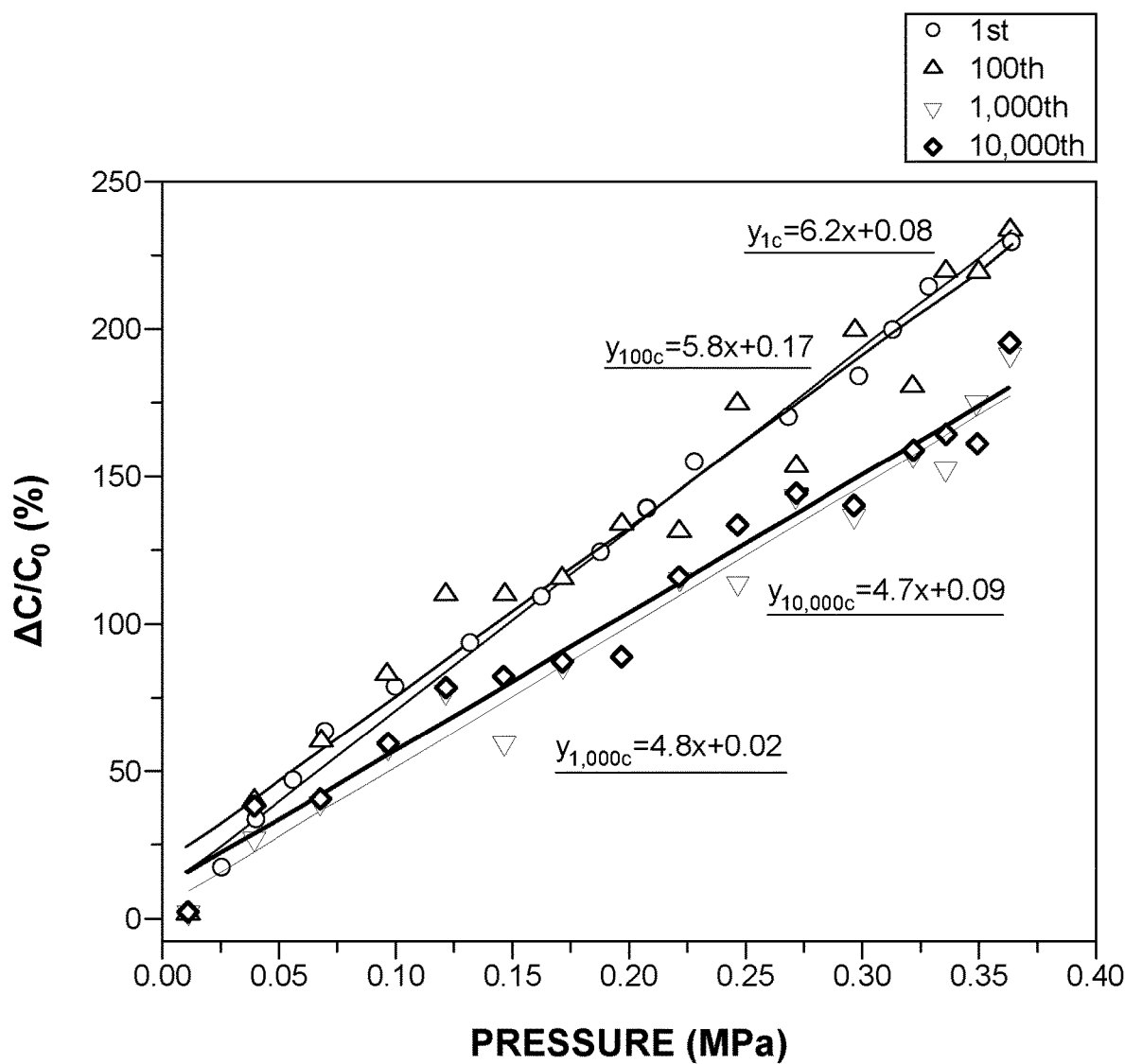

The pressure sensor was fabricated similar to a parallel-plate capacitor with SIS matrix and two RGO/AgMF electrodes embedded with a certain separation (FIG. 6c). When pressure is applied on the capacitor, the distance between two RGO/AgMF layers decrease (change from d$_0$ to d), resulting in an increase in capacitance. To measure the responses of our RGO/AgMF based sensor to mechanical pressure, a "home-made" system containing a dynamic force system (Instron E1000 dynacell) and a sensitive electric recorder (Agilent E4980A) was designed (FIG. 7a). This system can provide an external pressure with a range of 5~500 Kpa force, and the electrical signals can be simultaneously recorded. The relative change in capacitance with varying pressure is presented in FIG. 7b. The slope of the first cycle line is similar to 100 cycles line but a little higher than 1000 cycles and 10000 cycles, indicating that the sensor performance showed a little difference between the short cycles and long cycles at various pressures ranging from 10~350 KPa. This difference is possibly caused by the rebound property of SIS polymer. After 1000 cycles, the rebound property of SIS was relatively stable, so the sensor performance showed little changes between 1000 cycles and 10000 cycles. Even after ~10000 cycles, the line slope changed slightly, which indicated that this sensor showed a reliable performance at various pressures. The slope of the line traces is defined as the pressure sensitivity S,[30] which is usually used to evaluate the performance of a pressure sensor. After 10000 cycles, the sensitivity value is about 4.7 $MPa^{-1}$. This value is higher than that of silver nanowires embedded in PDMS (1.6 $MPa^{-1}$ over a pressure range below 500 KPa),[7] carbon nanotubes embedded in PDMS (0.23 $MPa^{-1}$ over a pressure range up to 1.0 MPa),[31] and gold electrodes (0.48 $MPa^{-1}$ for a pressure range up to 0.25 MPa).[32] The continuous of AgMF and RGO network provide a fast electron transfer, making this sensor has a fast response to the capacitance variation, which is the reason the sensor has a high sensitivity.

Figure 7C:
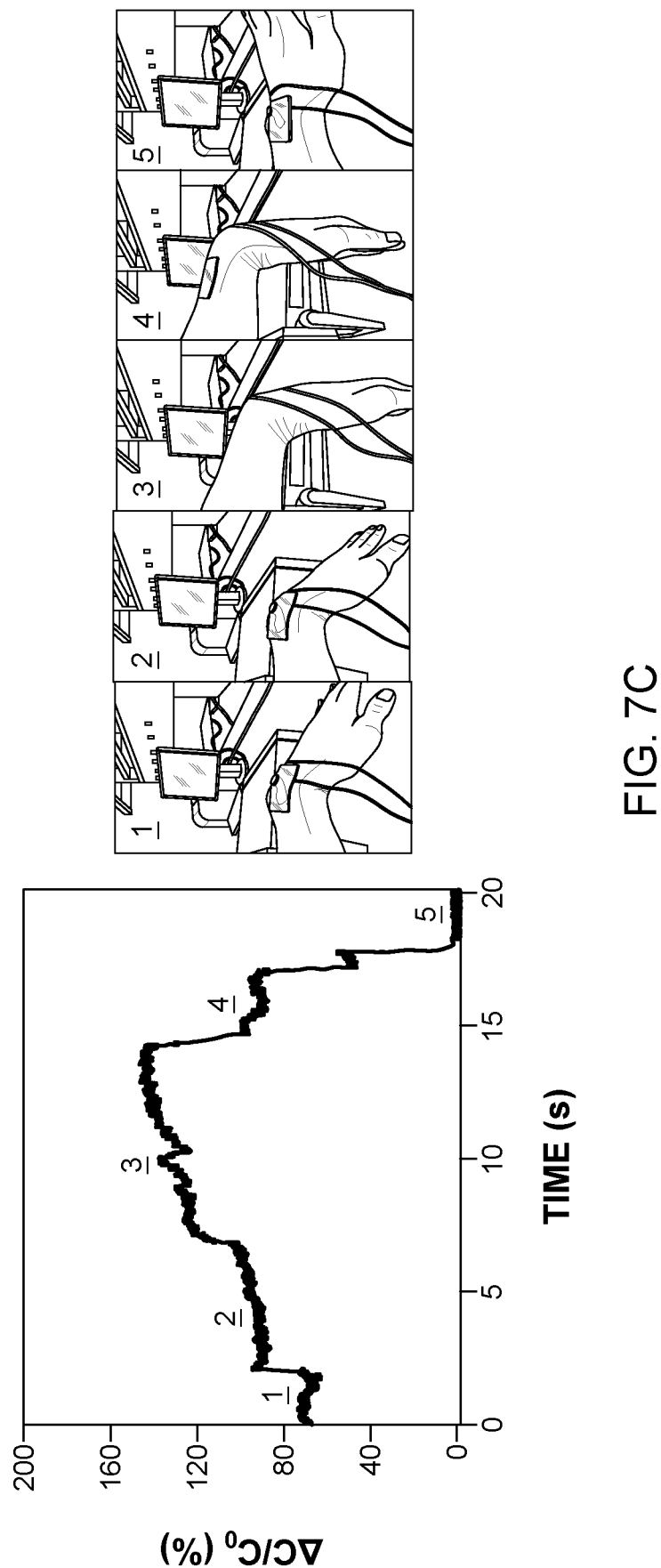
Figure 7D:
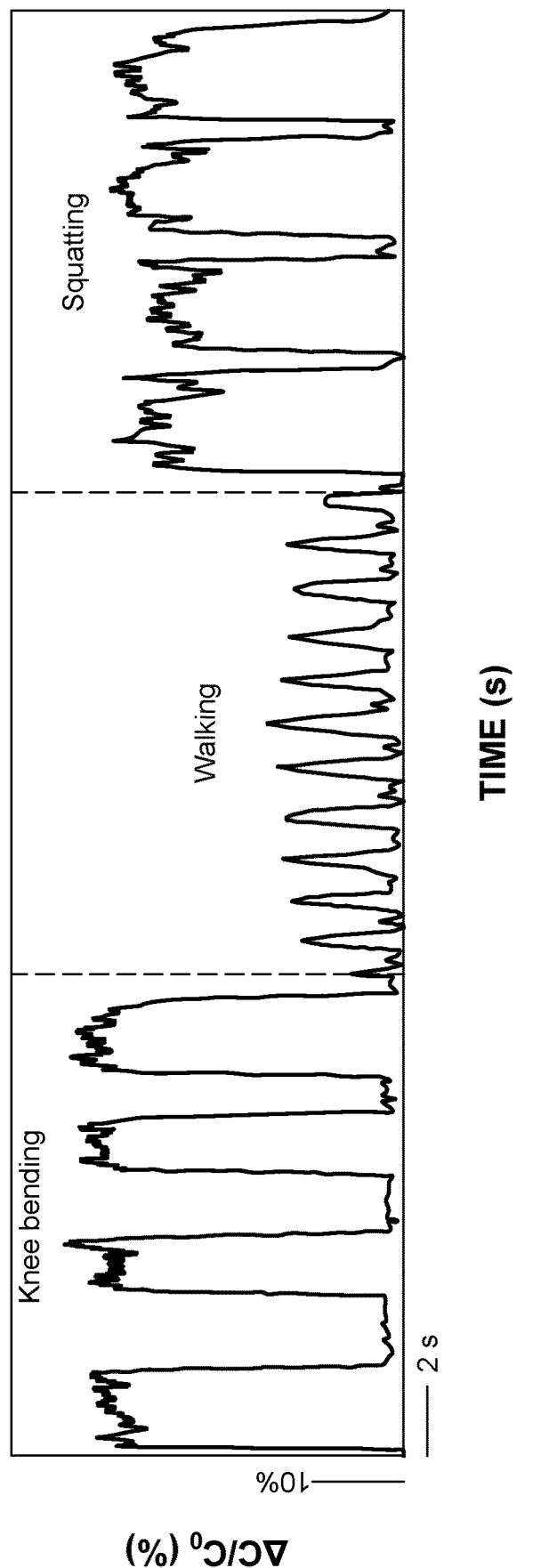
Figure 7E:
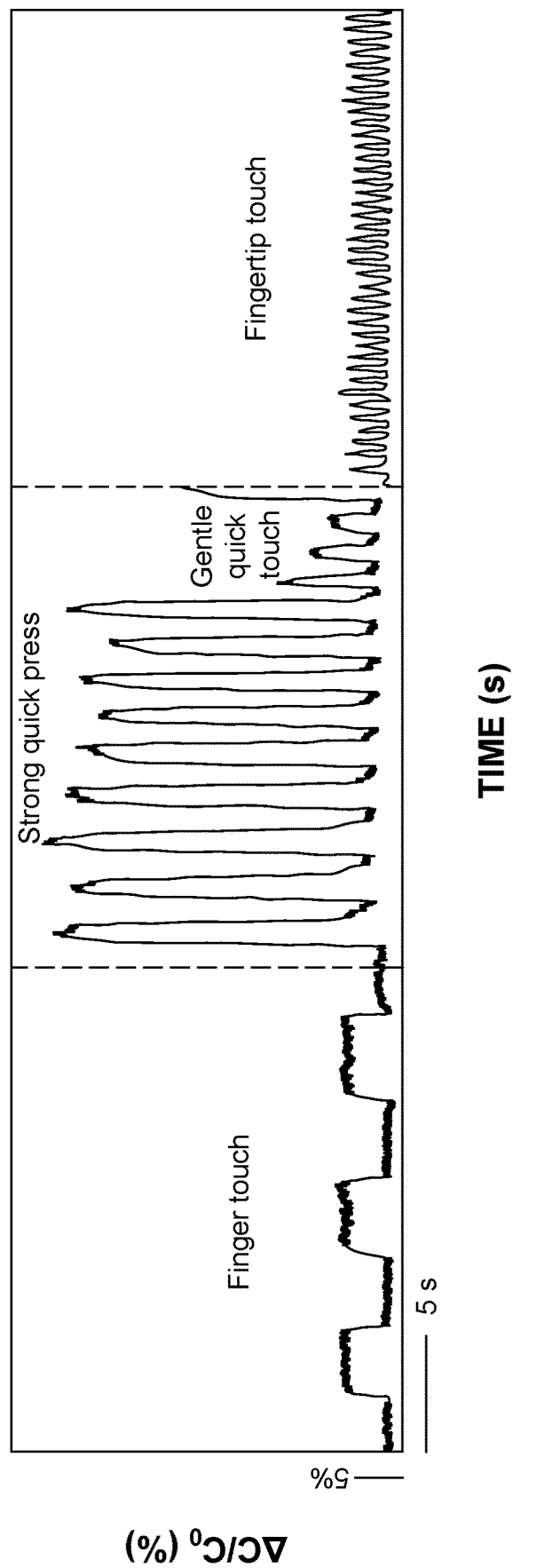

This sensor was tested for large-strain measurements in various applications, as shown in FIG. 7c-d. Due to the flexibility of the sensors, they can be attached onto the human body with the aid of medical tape. FIG. 7c shows the sensor placed onto a wrist for strain measurement. The change of capacitance was recorded clearly with the wrist movement. When the hand of an individual was kept at a natural slightly curved state (step 1), the sensor showed a relatively high capacitance. When the hand was curved further (step 2), the skin was under a slight tension strain leading to a slight increase in capacitance. The capacitance increased with curving the wrist more, and reached a maximum value when the hand was almost vertical (step 3). Then the capacitance decreased with releasing the wrist strain (step 4), and it was strain free when the wrist was kept at a horizontal level. By attaching the sensor to the knee, different movements such as walking, squatting and knee bending actions could be easily monitored (FIG. 7d). The system can furthermore detect a delicate finger touch as shown in FIG. 7e. The capacitance displayed a larger difference when pressing on the sensor rather than slightly touching it.

It was recently reported that nanostructured pattern array on flexible polymer surface can enhance the friction effect, resulting in a highly sensitive sensor.[33] In order to improve the sensitivity of our sensor, a patterned Si wafer served as a mold for the fabrication of SIS thin film with pyramid feature (FIG. 8). The SIS solution was first cast on the patterned Si wafer, and then the SIS membrane was peeled off from the wafer after it completely dried. The dried SIS membrane with patterned nanostructure array was attached onto the RGO/AgMF slide of RGO/AgMF/SIS film. FIG. 8a shows that this sensor treated with patterned nanostructure array has high sensitivity to a very light force. Loading or unloading a small screw with about 0.1 g weight (corresponding to a pressure of about 50 Pa) can cause a large and easily detectable change of capacitance.

EXPERIMENTAL SECTION

Materials:

Graphite flakes with particle size >100 mesh were supplied by Sigma-Aldrich. Other chemicals including sulfuric acid ($H_2SO_4$), sodium nitrate ($NaNO_3$), potassium permanganate ($KMnO_4$), hydrogen peroxide ($H_2O_2$), N-methyl-2-pyrrolidone (NMP), and silver nitrate ($AgNO_3$) were all purchased from Sigma-Aldrich and used without further treatment.

Preparation of GO:

Graphene oxide (GO) was synthesized from natural graphite flakes using a modified Hummers method.[34,35] A typical experiment was followed: 1.0 g of graphite powder and 1.0 g $NaNO_3$ was first dissolved in 100 mL of concentrated $H_2SO_4$. Then, 5.0 g $KMnO_4$ was slowly added to the mixture under vigorous agitation, and the solution was heated to 40° C. reacting for 2 days to get a brown suspension. Then, 200 mL deionized water was added to terminate the reaction following $H_2O_2$ addition to reduce the insoluble $KMnO_4$. The sample was centrifuged at 2000 rpm for 5 minutes, and the precipitate was repeatedly rinsed with deionized water several times to remove metal ions. At last, a viscous brown dispersion of graphite oxide solution was observed. After freeze-drying of the viscous brown solution, a loose graphite oxide powder was obtained. Finally, ultrasonic exfoliation method was applied to exfoliate graphite oxide to graphene oxide (GO). A certain weight of graphite oxide was dissolved in NMP with bath-sonicated for 30 min and then centrifuged at 4000 rpm for 5 min. The supernatant was collected, and the concentration of graphene oxide was calculated by reducing the precipitate part after freeze-drying.

Preparation of Reduced Graphene Oxide (RGO):

The RGO sheets were obtained by a simple one-step reduction approach. In a typical experiment, the as-prepared graphene oxide solution was further diluted to a certain concentration with NMP under ultrasonic treatment for 30 min, following heating in an oil bath at 180° C. with stirring for 1 h. RGO solution with black color was then successfully obtained. Uniform RGO membrane was prepared by vacuum filtration of the RGO dispersion through a Whatman inorganic Anodisc membrane filter.

Reduction of $AgNO_3$ to Ag Nanoparticles and Micro-Flakes on RGO Surface:

Silver nitrate ($AgNO_3$) was added to the as-prepared RGO/NMP solution, and then was heated in an oil bath at 110° C. for several hours. Depending on the reaction time, $AgNO_3$ mass and temperature, two different silver nanostructures can be obtained with RGO sheets, namely silver nanoparticles (AgNP) and silver micro-flakes (AgMF). Finally, the RGO/AgMF and RGO/AgNP membranes were collected by filtration.

Sensor Fabrication:

The prepared RGO/AgMF membrane was ready moved to a clean glass dish, and then connected to copper wire using silver paste. The prepared SIS solution (SIS completely dissolved in DCM) was then added to the glass dish. Samples were then completely dried in vacuum oven at 80° C. for 12 hours to evaporate small molecules such as water and residual organic solvent. At last, the dried film was peeled off from the glass dish, and two pieces of RGO/AgMF based films were attached together with RGO/AgMF side face to face.

Composites Characterization:

The X-ray powder diffraction (XRD) patterns were obtained by a Bruker D8 Advance (40 KV, 40 mA) with Cu Kα ($\lambda$=1.5406 Å) irradiation at a scanning rate of 2°·$min^{-1}$ in the 2θ range of 10-50°. The decomposition behavior was measured by the thermogravimetric analysis (TGA) using Netzsch TG 209 F1 Iris at a temperature range of 30-800° C. under $N_2$ flow with a heating rate of 10° C.·$min^{-1}$. Transmission electron microscopy (TEM) analysis and energy-dispersive x-ray spectroscopy (EDX) were performed on a Tecnai electron microscope at 120 kV (T12 FEI Company). A drop of the dilute solution of the homogenous mixture on the carbon-coated copper grid was dried in air at room temperature for 2 days. The morphological study of the composite was conducted on FEI Magellen (USA) scanning electron microscope (SEM). The cryo-fractured surfaces were coated with a thin layer of gold (5 nm). Electrical measurements were performed using a four-point probe measurement system (CMT-SR2000, MDC), and the average of five data points per sample was recorded.

Device Characterization:

The pressure sensitivity was measured by an Instron (Instron E 10000 dynacell) with linear grip using a 10 kN load cell and stress control mode. The current or capacitance difference and the I-V curves for the pressure sensor were recorded by a precision LCR meter (Agilent E4980A, 20 Hz-2M Hz).

REFERENCES 1-35

1. Lim, B. W.; Lu, X. M.; Jiang, M. J.; Camargo, P. H. C.; Cho, E. C.; Lee, E. P.; Xia, Y. N. Facile Synthesis of Highly Faceted Multioctahedral Pt Nanocrystals through Controlled Overgrowth. *Nano Lett.* 2008, 8, 4043-4047.
2. Sun, Y. G.; Xia, Y. N. Shape-Controlled Synthesis of Gold and Silver Nanoparticles. *Science* 2002, 298, 2176-2179.
3. Xie, J. P.; Zheng, Y. G.; Ying, J. Y. Protein-Directed Synthesis of Highly Fluorescent Gold Nanoclusters. *J. Am. Chem. Soc.* 2009, 131, 888-+.
4. Zhou, J. Y.; Saha, A.; Adamcik, J.; Hu, H. Q.; Kong, Q. S.; Li, C. X.; Mezzenga, R. Macroscopic Single-Crystal Gold Microflakes and Their Devices. *Adv. Mater.* 2015, 27, 1945-1950.
5. Xu, F.; Zhu, Y. Highly Conductive and Stretchable Silver Nanowire Conductors. *Adv. Mater.* 2012, 24, 5117-5122.
6. Yao, S. S.; Zhu, Y. Wearable Multifunctional Sensors Using Printed Stretchable Conductors Made of Silver Nanowires. *Nanoscale* 2014, 6, 2345-2352.
7. Gong, S.; Schwalb, W.; Wang, Y. W.; Chen, Y.; Tang, Y.; Si, J.; Shirinzadeh, B.; Cheng, W. L. A Wearable and Highly Sensitive Pressure Sensor with Ultrathin Gold Nanowires. *Nat. Commun.* 2014, 5, 3132.
8. Fang, J. X.; Ding, B. J.; Gleiter, H. Mesocrystals: Syntheses in Metals and Applications. *Chem. Soc. Rev.* 2011, 40, 5347-5360.
9. Brus, L. Size, Dimensionality, and Strong Electron Correlation in Nanoscience. *Accounts. Chem. Res.* 2014, 47, 2951-2959.
10. Fang, J. X.; Ma, X. N.; Cai, H. H.; Song, X. P.; Ding, B. J.; Guo, Y. Double-Interface Growth Mode of Fractal Silver Trees within Replacement Reaction. *Appl. Phys. Lett* 2006, 89, 173104.
11. Fang, J. X.; Ding, B. J.; Song, X. P. Self-assembly mechanism of platelike silver mesocrystal. *Appl. Phys. Lett.* 2007, 91, 083108.
12. Qin, H. L.; Wang, D.; Huang, Z. L.; Wu, D. M.; Zeng, Z. C.; Ren, B.; Xu, K.; Jin, J. Thickness-Controlled Synthesis of Ultrathin Au Sheets and Surface Plasmonic Property. *J. Am. Chem. Soc.* 2013, 135, 12544-12547.
13. Bolotin, K. I.; Sikes, K. J.; Jiang, Z.; Klima, M.; Fudenberg, G.; Hone, J.; Kim, P.; Stormer, H. L. Ultrahigh Electron Mobility in Suspended Graphene. *Solid State Commun.* 2008, 146, 351-355.
14. Balandin, A. A.; Ghosh, S.; Bao, W. Z.; Calizo, I.; Teweldebrhan, D.; Miao, F.; Lau, C. N. Superior Thermal Conductivity of Single-layer Graphene. *Nano Lett.* 2008, 8, 902-907.
15. Stoller, M. D.; Park, S. J.; Zhu, Y. W.; An, J. H.; Ruoff, R. S. Graphene-Based Ultracapacitors. *Nano Lett.* 2008, 8, 3498-3502.
16. Lui, C. H.; Liu, L.; Mak, K. F.; Flynn, G. W.; Heinz, T. F. Ultraflat graphene. *Nature* 2009, 462, 339-341.
17. Ghosh, S.; Bao, W. Z.; Nika, D. L.; Subrina, S.; Pokatilov, E. P.; Lau, C. N.; Balandin, A. A. Dimensional Crossover of Thermal Transport in Few-layer Graphene. *Nat. Mater.* 2010, 9, 555-558.
18. Li, X. L.; Wang, X. R.; Zhang, L.; Lee, S. W.; Dai, H. J. Chemically Derived, Ultrasmooth Graphene Nanoribbon Semiconductors. *Science* 2008, 319, 1229-1232
19. Worsley, M. A.; Pauzauskie, P. J.; Olson, T. Y.; Biener, J.; Satcher, J. H.; Baumann, T. F. Synthesis of Graphene Aerogel with High Electrical Conductivity. *J. Am. Chem. Soc.* 2010, 132, 14067-14069.
20. Park, S.; Ruoff, R. S. Chemical Methods for the Production of Graphenes. *Nat. Nanotechnol.* 2009, 4, 217-224.
21. Zhu, Y. W.; Stoller, M. D.; Cai, W. W.; Velamakanni, A.; Piner, R. D.; Chen, D.; Ruoff, R. S. Exfoliation of Graphite Oxide in Propylene Carbonate and Thermal Reduction of the Resulting Graphene Oxide Platelets. *Acs Nano* 2010, 4, 1227-1233.
22. Park, S.; An, J. H.; Jung, I. W.; Piner, R. D.; An, S. J.; Li, X. S.; Velamakanni, A.; Ruoff, R. S. Colloidal Suspensions of Highly Reduced Graphene Oxide in a Wide Variety of Organic Solvents. *Nano Lett.* 2009, 9, 1593-1597.
23. Fang, J. X.; Ding, B. J.; Song, X. P. Self-Assembly Ability of Building Units in Mesocrystal, Structural, and Morphological Transitions in Ag Nanostructures Growth. *Crystl. Growth Des.* 2008, 8, 3616-3622.
24. Xu, C.; Wang, X. Fabrication of Flexible Metal-Nanoparticle Film Using Graphene Oxide Sheets as Substrates. *Small* 2009, 5, 2212-2217.
25. Zhou, X. Z.; Huang, X.; Qi, X. Y.; Wu, S. X.; Xue, C.; Boey, F. Y. C.; Yan, Q. Y.; Chen, P.; Zhang, H. In Situ Synthesis of Metal Nanoparticles on Single-Layer Graphene Oxide and Reduced Graphene Oxide Surfaces. *J. Phys. Chem. C* 2009, 113, 10842-10846.
26. Jeon, S. H.; Xu, P.; Mack, N. H.; Chiang, L. Y.; Brown, L.; Wang, H. L. Understanding and Controlled Growth of Silver Nanoparticles Using Oxidized N-Methyl-pyrrolidone as a Reducing Agent. *J. Phys. Chem. C* 2010, 114, 36-40.
27. Penn, R. L.; Banfield, J. F. Imperfect Oriented Attachment: Dislocation Generation in Defect-Free Nanocrystals. *Science* 1998, 281, 969-971.
28. Fang, J. X.; You, H. J.; Kong, P.; Yi, Y.; Song, X. P.; Ding, B. J. Dendritic silver nanostructure growth and evolution in replacement reaction. *Crystl. Growth Des.* 2007, 7, 864-867.
29. Li, D. S.; Nielsen, M. H.; Lee, J. R. I.; Frandsen, C.; Banfield, J. F.; De Yoreo, J. J. Direction-Specific Interactions Control Crystal Growth by Oriented *Attachment*. *Science* 2012, 336, 1014-1018.
30. Mannsfeld, S. C. B.; Tee, B. C. K.; Stoltenberg, R. M.; Chen, C. V. H. H.; Barman, S.; Muir, B. V. O.; Sokolov, A. N.; Reese, C.; Bao, Z. N. Highly Sensitive Flexible Pressure Sensors with Microstructured Rubber Dielectric Layers. *Nat. Mater.* 2010, 9, 859-864.
31. Lipomi, D. J.; Vosgueritchian, M.; Tee, B. C. K.; Hellstrom, S. L.; Lee, J. A.; Fox, C. H.; Bao, Z. N. Skin-like Pressure and Strain Sensors Based on Transparent Elastic Films of Carbon Nanotubes. *Nat. Nanotechnol.* 2011, 6, 788-792.
32. Ying, M.; Bonifas, A. P.; Lu, N. S.; Su, Y. W.; Li, R.; Cheng, H. Y.; Ameen, A.; Huang, Y. G.; Rogers, J. A. Silicon Nanomembranes for Fingertip Electronics. *Nanotechnology* 2012, 23, 344004.
33. Fan, F. R.; Lin, L.; Zhu, G.; Wu, W. Z.; Zhang, R.; Wang, Z. L. Transparent Triboelectric Nanogenerators and Self- Powered Pressure Sensors Based on Micropatterned Plastic Films. *Nano Lett.* 2012, 12, 3109-3114.
34. He, D. P.; Jiang, Y. L.; Lv, H. F.; Pan, M.; Mu, S. C. Nitrogen-doped Reduced Graphene Oxide Supports for Noble Metal Catalysts with Greatly Enhanced Activity and Stability. *Appl. Catal. B-environ* 2013, 132, 379-388.
35. Hummers, W. S.; Offeman, R. E. Preparation of Graphitic Oxide. *J. Am. Chem. Soc.* 1958, 80, 1339-1339.

Supporting Information

Characterization of Hybrid Membranes

X-Ray Diffraction (XRD)

Figure 9A:
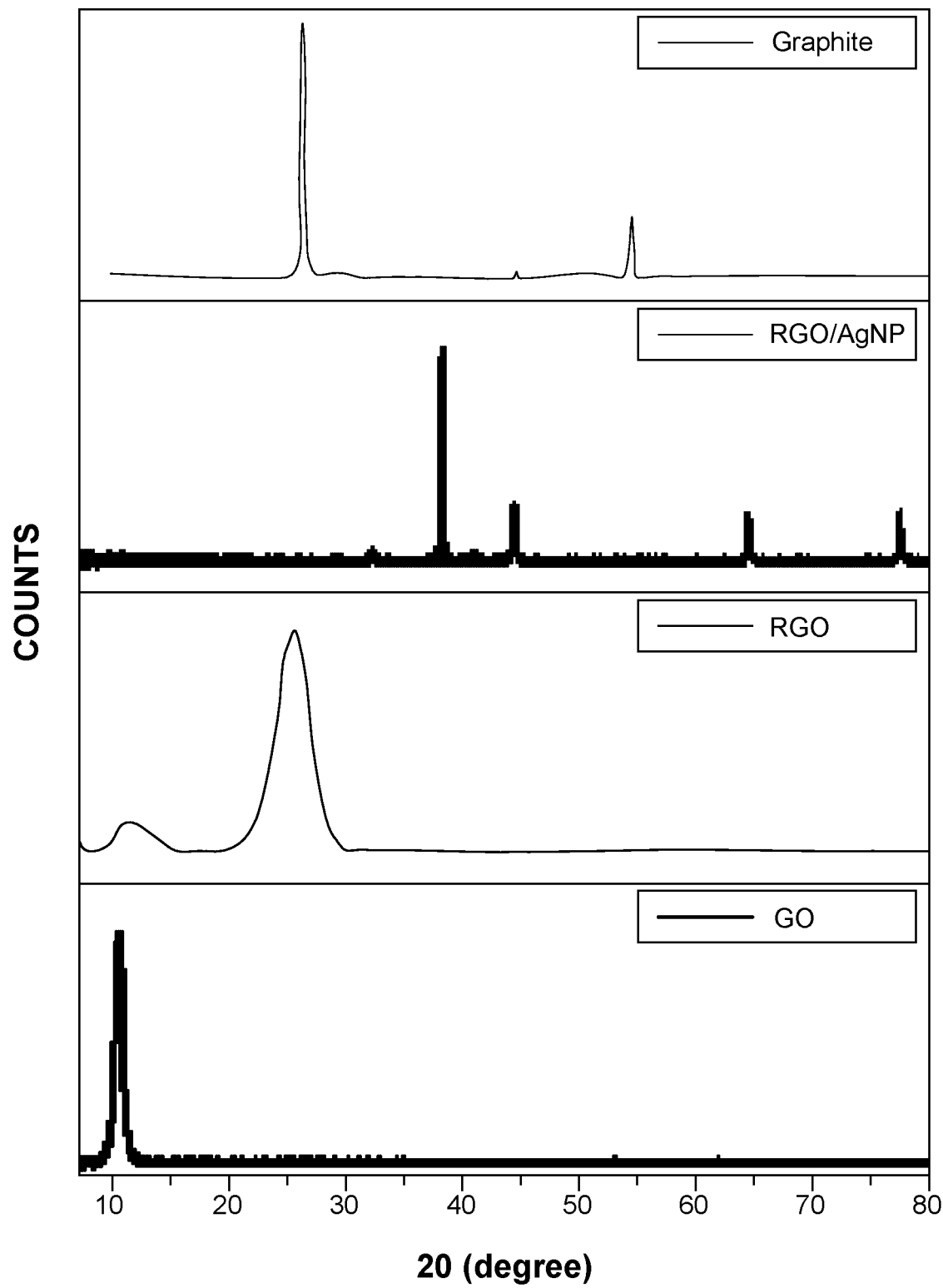
FIG. 9. (a) XRD, (b) Raman spectra and (c) TGA curves of the pristine graphite, GO, RGO and RGO/AgNP, (d) EDX spectrum of RGO membrane with silver nanoparticles on the surface. Reducing AgNO$_3$ at 60° C. for 16 h; AgNO$_3$ concentration is 60 mM; RGO concentration in NMP is 2.0 mg·mL$^{-1}$.

The structural changes arising from the oxidation of graphite and the reduction of GO can be examined by the XRD technique. As shown in FIG. 9a, pristine graphite exhibits a characteristic sharp peak at 2θ=26.8° corresponding to a d-spacing of 0.33 nm. After oxidization of graphite to GO using the Hummers method, this peak shifts downward to a lower angle (2θ=10.6°) with a corresponding d-spacing of 0.83 nm. This can be attributed to the expansion of the 0.50 nm space between typical graphene sheets, which is caused by the presence of a small amount of residual oxygen-containing groups on GO sheets.[1-3] While for the XRD pattern of RGO, this sharp peak disappeared, and became a broader shoulder at around 11.5°, corresponding to 0.76 nm of d-spacing. In addition, another broad peak centered at around 25.5° was observed, corresponding to an interlayer spacing of about 0.36 nm. The presence of this peak in RGO sheet indicates that some parts of the GO sheets were reduced successfully which induced the decrease in the spacing. The major diffraction peaks in the powder pattern of RGO/AgNP at 2θ=38.2°, 44.3°, 64.6°, and 77.5° can be assigned to the (111), (200), (220), and (311) crystalline planes of silver, respectively, which indicated that the reduced silver nanoparticles are composed of pure crystalline silver and own face-centered cubic (fcc) phase (JCPDS Crad File, 4-783). However, there is no distinguishable diffraction peaks of RGO, GO or graphite were observed in RGO/AgNP sample. A possible reason is that the strong Ag signals may cover the RGO diffraction peaks. Another possibility is that the regular stacks of graphene sheets or graphite are destroyed by exfoliation after deposition of the metal particles.[4,5] The SEM images (FIG. 10) confirmed the deposition of AgNP on graphene sheets, and the distance between the sheets was expanded.

Raman Spectra

Figure 9B:
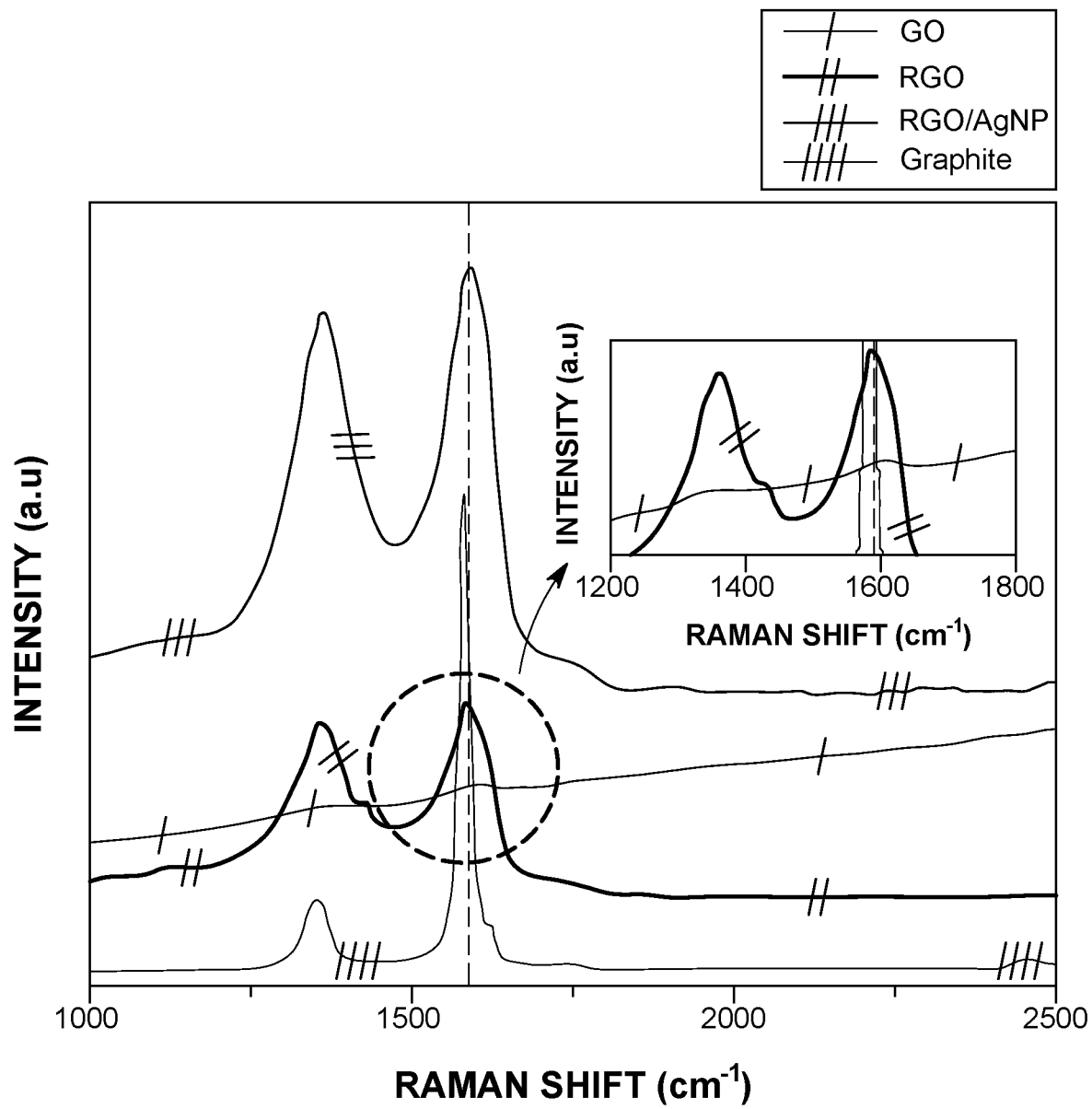

The Raman spectrum of pristine graphite exhibited two intense peaks at 1352 and 1582 cm$^{-1}$, corresponding to the D and G bands respectively (FIG. 9b). The G peak of GO red shifted to 1601 cm$^{-1}$, due to the introduction of oxygen-containing groups, which indicates a higher degree of disorder or more defects in GO. After reduction, the G peak blue shifted to 1585 cm$^{-1}$ indicating a successful reduction to GO. This can also be verified by the ratio of $I_D/I_G$. The G band is related to the in-plane vibration of sp$^2$-bonded carbon atoms, while the D band is associated with the vibration of carbon atoms with sp$^3$ electronic configuration of disordered graphene. The $I_D/I_G$ ratio of RGO (0.917), as calculated from FIG. 9b, was found higher than that of GO (0.835), revealing a substantial reduction in the content of the sp3-bonded carbon atoms and the oxidized molecular defects.[6,7] It was found that the RGO/AgNP showed a similar D and G peak in Raman spectra, but the intensities of D and G were much higher than those of RGO under comparable test conditions. This surface enhanced Raman spectrum (SERS) phenomenon is caused by the charge-transfer interaction between RGO and AgNP.[8]

Thermogravimetric Analysis (TGA)

Figure 9C:
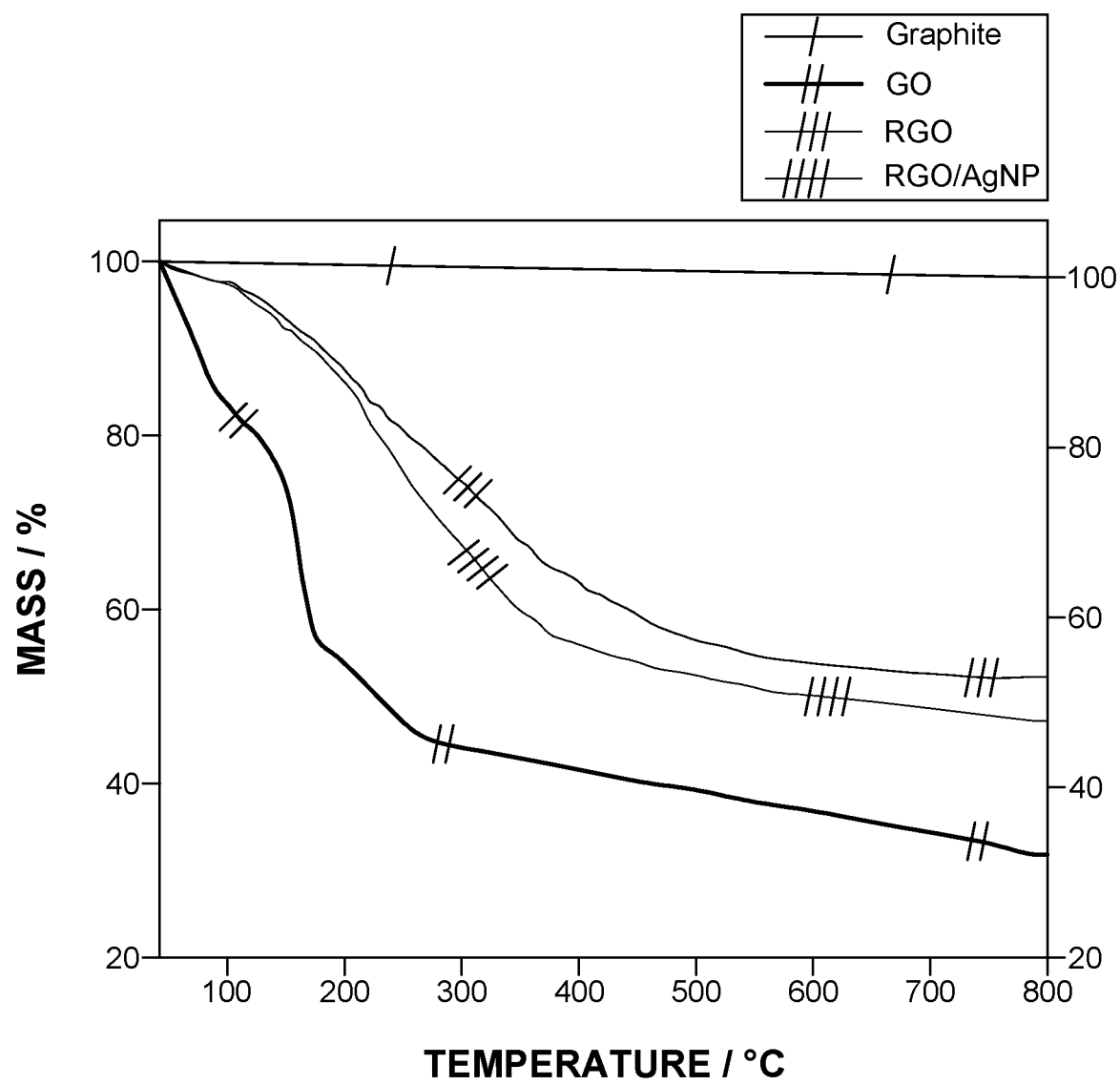

From FIG. 9c, a good thermal stability reaching a very high temperature (800° C.) was observed for graphite. In contrast, GO sheet exhibited poorer thermal stability. TGA plot shows a loss of about 20 wt % at 100° C., which can be attributed to water molecules loss of stacked graphene oxide sheet.[3] While RGO sheet shows a much smaller weight loss at 100° C. (less than 5 wt %), suggesting a smaller amount of water or organic molecules are trapped in the RGO structures. Compared with RGO itself, the TGA curve of RGO/AgNP displayed a similar profile, indicating that the reduction of silver particles did not affect materially the thermal stability of RGO, e.g., a good thermal stability can be retained of RGO/AgNP hybrid.

Energy-Dispersive X-Ray Spectroscopy (EDX)

Figure 9D:
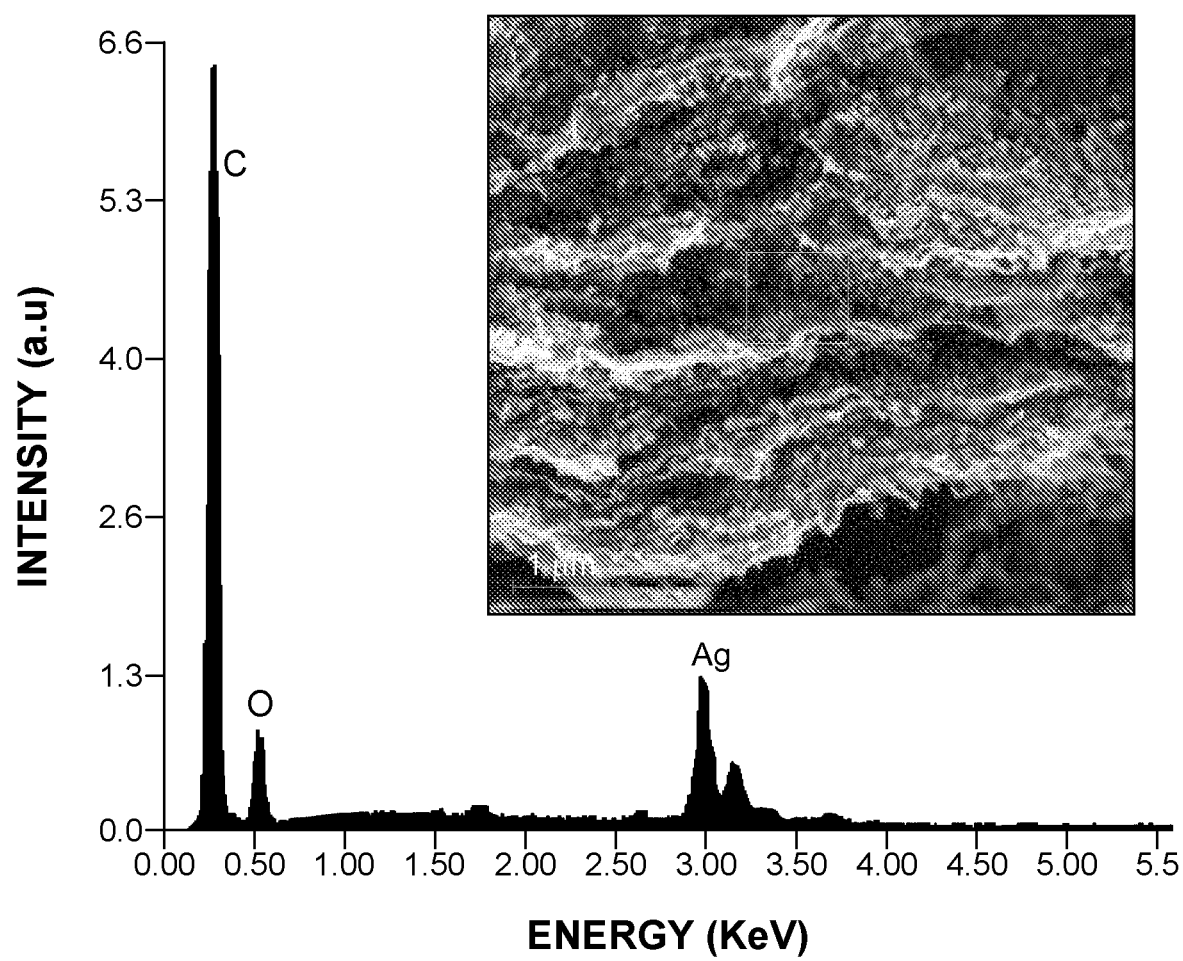

The direct evidence of silver particles deposited on RGO sheets was obtained by EDX. FIG. 9d showed a typical SEM cross-section image of RGO/AgNP hybrid. A lot of nanoparticles were observed on RGO surface. The larger silver peak showed in EDX result indicated that the particles deposited on RGO surface were silver nanoparticles. The oxygenated group existed in RGO sheet takes an effect in absorbing metal ions and metal nanoparticles.[9] These oxygen species are uniformly distributed on the RGO surface and would provide active sites to absorb silver ions. RGO sheets also could provide a large support surface to disperse Ag$^+$ ions. So in situ reduction of Ag$^+$ ions allowed AgNPs to distribute uniformly and anchor onto RGO nanosheets, as shown in FIG. 10a. Meanwhile, NMP also takes a very important role in reducing Ag$^+$ ions to AgNPs. First, NMP was oxidized in the presence of heat to form a peroxide species, and then further transformed NMP to 5-hydroxy-N-methyl-2-pyrrolidone which acted as a reducing agent for reducing Ag$^+$ ions to AgNPs.[10]

REFERENCES 1-10 FOR SUPPORTING INFORMATION SECTION

1. Dikin, D. A.; Stankovich, S.; Zimney, E. J.; Piner, R. D.; Dommett, G. H. B.; Evmenenko, G.; Nguyen, S. T.; Ruoff, R. S. Preparation and Characterization of Graphene Oxide Paper. *Nature* 2007, 448, 457-460.
2. Jeong, H. K.; Lee, Y. P.; Lahaye, R. J. W. E.; Park, M. H.; An, K. H.; Kim, I. J.; Yang, C. W.; Park, C. Y.; Ruoff, R. S.; Lee, Y. H. Evidence of Graphitic AB Stacking Order of Graphite Oxides. *J. Am. Chem. Soc.* 2008, 130, 1362-1366.
3. Dubin, S.; Gilje, S.; Wang, K.; Tung, V. C.; Cha, K.; Hall, A. S.; Farrar, J.; Varshneya, R.; Yang, Y.; Kaner, R. B. A One-Step, Solvothermal Reduction Method for Producing Reduced Graphene Oxide Dispersions in Organic Solvents. *Acs Nano* 2010, 4, 3845-3852.
4. Si, Y. C.; Samulski, E. T. Exfoliated Graphene Separated by Platinum *Nanoparticles. Chem. Mater.* 2008, 20, 6792-6797.
5. Yang, Y. K.; He, C. E.; He, W. J.; Yu, L. J.; Peng, R. G.; Xie, X. L.; Wang, X. B.; Mai, Y. W. Reduction of Silver Nanoparticles onto Graphene Oxide Nanosheets with N,N-Dimethylformamide and SERS Activities of GO/Ag Composites. *J. Nanopart. Res.* 2011, 13, 5571-5581.
6. Tung, V. C.; Allen, M. J.; Yang, Y.; Kaner, R. B. High-Throughput Solution Processing of Large-Scale Graphene. *Nat. Nanotechnol.* 2009, 4, 25-29.
7. Ai, K. L.; Liu, Y. L.; Lu, L. H.; Cheng, X. L.; Huo, L. H. A Novel Strategy for Making Soluble Reduced Graphene Oxide sheets Cheaply by Adopting an Endogenous Reducing Agent. *J. Mater. Chem.* 2011, 21, 3365-3370.

8. Fu, X. Q.; Bei, F. L.; Wang, X.; O'Brien, S.; Lombardi, J. R. Excitation Profile of Surface-Enhanced Raman Scattering in Graphene-Metal Nanoparticle based Derivatives. Nanoscale 2010, 2, 1461-1466.
9. Zhou, X. Z.; Huang, X.; Qi, X. Y.; Wu, S. X.; Xue, C.; Boey, F. Y. C.; Yan, Q. Y.; Chen, P.; Zhang, H. In Situ Synthesis of Metal Nanoparticles on Single-Layer Graphene Oxide and Reduced Graphene Oxide Surfaces. J. Phys. Chem. C 2009, 113, 10842-10846.
10. Jeon, S. H.; Xu, P.; Mack, N. H.; Chiang, L. Y.; Brown, L.; Wang, H. L. Understanding and Controlled Growth of Silver Nanoparticles Using Oxidized N-Methyl-pyrrolidone as a Reducing Agent. J. Phys. Chem. C 2010, 114, 36-40.

ADDITIONAL REFERENCES

The following additional references can be used by one skilled in the art to help support the practice of the claimed invention as appropriate.

Liz-Marzan et al. [Adv. Fund. Mater. 2009, 19, 679-688] used N,N-dimethylformamide as a reaction medium for metal nanoparticle synthesis.

Xie et al. [Materials Research Bulletin 2011, 46, 2004-2008.] used L-ascorbic acid (L-AA) as reducing agent successfully synthesized reduced graphite oxide-silver nanocomposite by one step method.

Han et al. [Adv. Mater. 2013, 25, 872-877] reported a hybrid double-floating gate memory device by utilizing an RGO-sheet monolayer and a gold nanoparticle array as upper and lower floating gates, respectively.

Baik et al. [Nat. Nanotech. 2010, 5, 853-857.] prepared a highly conductive, printable and stretchable composite film with carbon nanotube and silver embedded.

Liang et al. [ACS Nano. 2014, 8, 1590-1600] used silver nanowire modified graphene oxide which can form a silver nanowire percolation network inside. They applied this complex to stretchable polymer light-emitting diodes that could be stretched by as much as 130% and repeatedly by 40%.

Fang et al. [Appl. Phys. Lett. 2006, 89, 173104; Appl. Phys. Lett. 2007, 91, 083108] used a replacement reaction to deposit silver plate with single crystallization in solution.

What is claimed is:

1. A composition comprising:
   at least one graphene material, and
   at least one metal,
   wherein the metal is in a form which includes metal microflakes which have an average thickness of about 10 nm to about 500 nm.

2. The composition of claim 1, wherein the graphene material is reduced graphene oxide.

3. The composition of claim 1, wherein the metal is in the form of metal nanoparticles and the metal microflakes.

4. The composition of claim 1, wherein the graphene material comprises a plurality of layered graphene sheets, and the metal is intercalated within the graphene sheets of the graphene material.

5. The composition of claim 1, wherein the metal microflakes have an average length of at least one micron.

6. The composition of claim 1, wherein the composition has an electronic conductivity of at least $7 \times 10^5$ S/cm.

7. The composition of claim 1, wherein the composition further comprises at least one polymer.

8. An article comprising:
   a first layer of silver micro-flakes (AgMF) intercalated with reduced graphene oxide (RGO);
   a second layer of AgMF intercalated with RGO; and
   a polymeric elastomer sandwiched between the first and second layers,
   wherein the first and second layers and the polymeric elastomer are arranged so that a capacitance between the first and second layers changes when an external force is applied on one of the first and second layers and the article acts as a sensor.

9. The article of claim 8, wherein the first and second layers are in the form of a film, sheet, or membrane.

10. The article of claim 8, wherein the article is a pressure sensor.

11. The article of claim 8, wherein the polymeric elastomer is styrene-isoprene-styrene.

12. The article of claim 8, wherein the polymeric elastomer forms a matrix in which the first and second layers are embedded or as membranes.

13. A method of forming a pressure sensor, the method comprising:
   preparing a reaction mixture comprising (i) at least one graphene material; (ii) at least one precursor for silver; and (iii) a solvent or dispersant system;
   reacting the reaction mixture under conditions sufficient to form a first layer embedded into a first polymeric elastomer and a second layer embedded into a second polymeric elastomer, wherein each of the first and second layers includes silver micro-flakes (AgMF) intercalated with reduced graphene oxide (RGO); and
   attaching together the first polymeric elastomer and the second polymeric elastomer so that part of the first and second polymeric elastomers are sandwiched between the first and second layers,
   wherein the first and second layers and the polymeric elastomer are arranged so that a capacitance between the first and second layers is changed when an external force is applied.

14. The method of claim 13, wherein the reacting step includes a reduction of the precursor of silver to silver.

15. The method of claim 13, wherein the method is a one pot preparation method.

16. The method of claim 13, wherein the solvent or dispersant system comprises a major solvent or dispersant component having a boiling point of at least 150° C.

17. The method of claim 13, wherein the concentration of the (ii) precursor for silver is at least 12 mM.

18. The method of claim 13, wherein the concentration of the (ii) precursor for silver is at least 2.4 M.

19. The method of claim 13, wherein the concentration of the (ii) precursor for the silver is sufficiently high enough to cause creation of the silver microflakes in the first and second layers.

* * * * *